United States Patent [19] [11] 4,091,902

Hamada [45] May 30, 1978

[54] CLUTCH CONTROL APPARATUS

[75] Inventor: Hideo Hamada, Yokosuka, Japan

[73] Assignee: Nissan Motor Company, Ltd., Japan

[21] Appl. No.: 685,167

[22] Filed: May 11, 1976

[30] Foreign Application Priority Data

May 12, 1975 Japan .................................. 50-56451
May 19, 1975 Japan .................................. 50-60024
Jun. 13, 1975 Japan .................................. 50-72480
Jun. 24, 1975 Japan .................................. 50-77673
Jun. 30, 1975 Japan .................................. 50-80723

[51] Int. Cl.² ........................................... B60K 29/00
[52] U.S. Cl. .................................. 192/.076; 192/.044; 192/.052
[58] Field of Search ................... 192/.075, .076, .033, 192/.052

[56] References Cited

U.S. PATENT DOCUMENTS

| 1,964,693 | 6/1934 | Hill | 192/.075 |
| 2,134,576 | 10/1938 | Price et al. | 192/.075 X |
| 2,296,290 | 9/1942 | Mayrath | 192/.052 |
| 2,983,346 | 5/1961 | Weymann | 192/.076 |
| 3,273,679 | 9/1966 | Uher | 192/.076 X |

Primary Examiner—Benjamin W. Wyche
Attorney, Agent, or Firm—Robert E. Burns; Emmanuel J. Lobato; Bruce L. Adams

[57] ABSTRACT

An apparatus for controlling an automatically operated clutch assembly for use with a manually operated power transmission system of an automotive driveline, comprising a fluid operated actuating mechanism for the clutch assembly and an electric control arrangement for operating the clutch actuating mechanism in a manner to drive the clutch assembly at different velocities responsive to various operational conditions of the vehicle when the clutch assembly is to be coupled for starting the vehicle from a halt or making shift between transmission gear positions.

9 Claims, 19 Drawing Figures

| GEAR POSITION | NEUTRAL | | | | |
|---|---|---|---|---|---|
| VEHICLE SPEED | 0 | 10 | 20 | 30 | km/hr |
| CLUTCH ASS'Y | COUPLED | UNCOUPLED | | | |

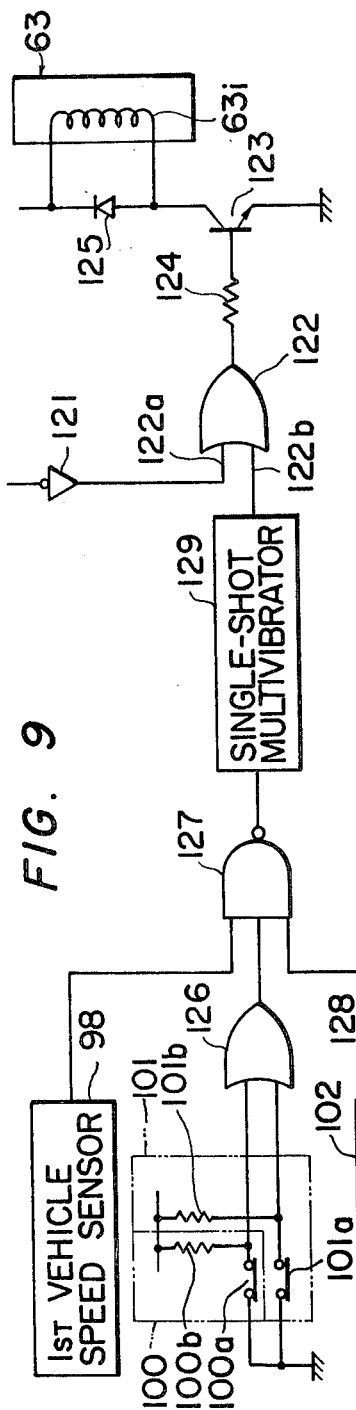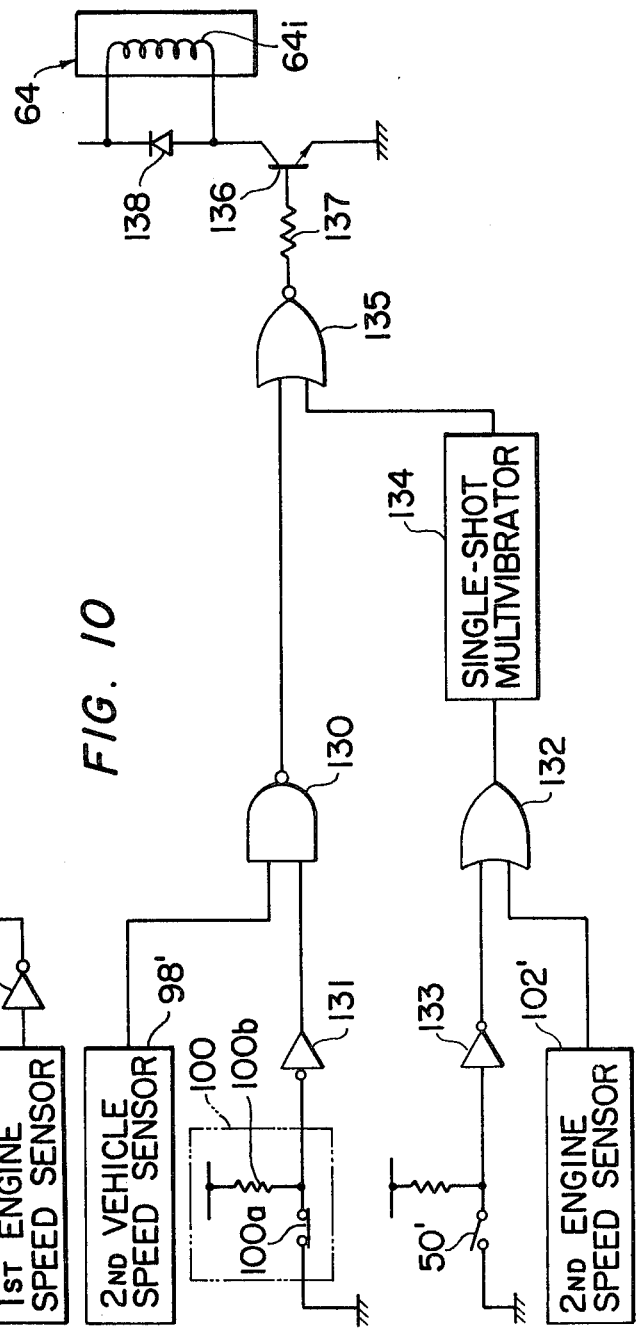
FIG. 9
FIG. 10

CLUTCH CONTROL APPARATUS

BACKGROUND OF THE INVENTION

The present invention relates to a clutch arrangement for use in an automotive driveline and particularly to an apparatus for controlling an automatically operated clutch assembly for use with a manually operated power transmission system of an automotive vehicle.

An automatically operated clutch assembly for automotive use is usually of a dry-disc friction type and difficulties have been encountered in putting such a clutch assembly to practical use primarily for the following reasons. One reason is that the pressure exerted between the driving and driven members of the clutch assembly can not be controlled accurately during a partially coupled condition of the clutch assembly when the driving and driven members tend to slide on each other. Another reason is that the engine is restrained from delivering an output speed to match the position of the accelerator pedal when the driveline posterior to the clutch assembly is subjected to an increased load. When, furthermore, the clutch assembly is actuated repeatedly at short intervals, the temperature of the clutch disc is increased excessively and causes reduction of the friction of the clutch facings. This adds to the tendency of the driving and driven members of the clutch assembly to slide on each other and causes the engine to operate in an unloaded condition producing an extremely high output speed.

To avoid these problems, attempts have been made to provide an automatic clutch arrangement using a combination of a torque converter or a magnetic-particle or centrifugal clutch assembly for the purpose of starting the vehicle from a halt and a dry-disc friction clutch for the shifting of gear positions in the transmission system. The clutch arrangement of this nature is controlled in dependence upon each individual clutch assembly and, for this reason, not only expensive control devices are required but there is a tendency that the manipulative efforts of the vehicle operator are ineffective. If, furthermore, a torque converter is utilized for the starting of the vehicle, the fuel consumption rate of the engine becomes far higher than in a vehicle using a manually operated clutch arrangement due to the sliding tendency between the driving and driven members of the torque converter. Such a drawback is also involved in a fluid-operated fully automated power transmission system.

SUMMARY OF THE INVENTION

It is, therefore, a prime object of the present invention to provide an automatically operated clutch arrangement using a single clutch assembly and nevertheless capable of producing satisfactory clutch actions when the vehicle is to be started from a halt and when gear positions are to be shifted.

In an ordinary clutch arrangement for use in an automotive vehicle, the clutch assembly is operated to be coupled when a neutral gear position is selected in the power transmission system. If the clutch assembly is of the automatically operated type, therefore, the operator of the vehicle must take procedures to uncouple the clutch assembly before he operates the transmission gear shift lever for shifting the gear position from the neutral. Such procedures could be dispensed with if arrangements are made so that the clutch assembly is held uncoupled during neutral condition of the power transmission system. This will provide ease of operation in shifting the gear positions but raises a problem in that the release mechanism of the clutch assembly is held loaded throughout the neutral condition and gives rise to wear of the mechanism.

It is, therefore, another object of the present invention to provide an automatically operated clutch arrangement in which a clutch assembly is uncoupled under neutral condition if the vehicle speed is higher than a predetermined level and is coupled under neutral condition if the vehicle is at rest or being driven at a speed lower than the predetermined level.

Still another object of the invention is to provide an automatically operated clutch arrangement in which the clutch assembly is controlled to be uncoupled when the vehicle is decelerated to a speed lower than a predetermined level if an offneutral or driving gear position is established in the power transmission system. This is conducive to preventing the engine from being caused to stop when the vehicle is decelerated for being stopped.

Still another object of the invention is to provide an automatically operated clutch arrangement in which the clutch assembly is driven toward the fully coupled condition at a rate controlled in relation to variation in the vehicle speed.

In accordance with the present invention, there is provided an apparatus for controlling a clutch assembly which is operative between a fully coupled condition and a fully uncoupled condition through an allowance disengagement range in which the clutch assembly is initiated into motion to couple but remains uncoupled and a partial torque transmission range in which the clutch assembly is partially coupled, comprising a clutch actuating mechanism including a control chamber contractable and expansible between a maximum-volume condition producing the fully coupled condition in the clutch assembly and a minimum-volume condition producing the fully uncoupled condition in the clutch assembly, an electrically operated valve arrangement including a vacuum port for providing communication between the control chamber and a source of vacuum and a plurality of air ports each for providing communication between the control chamber and the open air, the vacuum port being open to develop vacuum in the control chamber for causing the control chamber to contract toward the minimum-volume condition, the air ports having different cross sectional areas and being selectively opened to admit atmospheric air into the control chamber at different rates for causing the control chamber to expand at different rates and accordingly driving the clutch assembly at different velocities toward the fully coupled condition, and an electric control circuit including stationary switch means responsive to transition of the clutch assembly between the above mentioned allowance disengagement range and partial torque transmission range and throttle-valve position responsive means responsive to variation in the opening degree of the throttle valve of the mixture supply system of the vehicle engine, the control circuit being operative to cause the valve arrangement to close the vacuum port in response to predetermined conditions in which the clutch assembly is to be coupled, the control circuit being further operative to cause the air port with the largest sectional area to open and communicate with the control chamber when the clutch assembly is operating in the allowance disengagement range and to close in response to the transition of the clutch assembly from the allowance disengagement range to the partial torque transmission range and causing the remaining air ports to selectively open and communicate with the control chamber in response to variation in the throttle opening degree detected by the throttle responsive means when the clutch assembly is operating in the partial torque transmission range.

The above described valve arrangement comprises first, second, third and fourth valve units each having first, second and third ports and a first condition providing communication between the first and third ports thereof and a second condition providing communication between the first and second ports thereof, the first port of said first valve unit being in constant communication with the control chamber, the second port of the first valve unit constitutiing the vacuum port, the respective first ports of the second, third and fourth valve unit being in constant communication with the respective third ports of the first, second and third valve units, respectively, the respective second ports of the second, third and fourth valve units and the third port of the fourth valve unit constituting the air ports, the second port of the second valve unit constituting the air port with the largest sectional area, the third port of the fourth valve unit being smaller in cross sectional area than the second port of the third valve unit and larger in cross sectional area than the second port of the fourth valve unit, the control circuit being operative to control the valve arrangement so as to operate the first valve unit into the first condition thereof in response to predetermined conditions for actuating the clutch assembly toward the fully coupled condition, to hold the first valve unit in the first condition thereof and the second valve unit in the second condition thereof when the clutch assembly is operating in the allowance disengagement range, to hold both of the first and second valve units in the respective second conditions thereof and the third valve unit in the first condition thereof for a period of time variable with the throttle valve opening degree after the clutch assembly has been put into operation in the partial torque transmission range, and to hold all the first, second and third valve units in the respective first conditions thereof and the fourth valve unit in the first or second condition thereof upon lapse of the aforesaid period of time.

In this instance, the throttle-valve position responsive means comprises movable switch means movable with the throttle valve and responsive to the control chamber being expanded toward the maximum-valaume condition, the stationary switch means being electrically connected to the second valve unit for actuating the second valve unit into the second condition thereof in response to the transition of the clutch assembly from the allowance disengagement range into the partial torque transmission range, the movable switch means being electrically connected to the third valve unit for actuating the third valve unit into the second condition thereof upon lapse of the aforesaid period of time.

As an alternative, the throttle-valve position responsive means may comprise a plurality of throttle-valve position sensors responsive to throttle valve opening degrees of different values, in which instance the control circuit further compresess a first vehicle speed sensor responsive to a vehicle speed of a predetermined first level, a second vehicle speed sensor responsive to a vehicle speed of s predetermined second level which is lower than the first level, a first engine speed sensor responsive to an engine output speed of a predetermined first level, a second engine speed sensor responsive to a predetermined second level lower than the above mentioned first level, the throttle-valve position sensors being the first vehicle speed and engine speed sensors being electrically connected to the third valve unit and operative to actuate the third valve unit into the aforesaid second condition thereof for a predetermined period of time each time the throttle valve opening degree exceeds the particular value predetermined for each of the throttle-valve position sensors provided the vehicle speed detected by the first vehicle speed sensor is lower than the first level or for a predetermined period of time in response to an engine speed higher than the first level provided the vehicle speed detected by the first vehicle speed sensor is lower than the aforesaid first level and the throttle valve opening degree detected by the throttle-valve position sensors is larger than predetermined one of the aforesaid values, one of the throttle-valve position sensors and the second vehicle speed and engine speed sensors being electrically connected to the fourth valve unit and operative to actuate the fourth valve unit into the second condition thereof in response to an engine output speed lower than the aforesaid second level provided the vehicle speed detected by the second vehicle speed sensor is lower than the aforesaid second level and the throttle valve opening degree detected by the aforesaid one of the throttle-valve position sensors is smaller than the predetermined one of the aforesaid values and to hold the fourth valve unit in the first condition thereof for a predetermined period of time in response to an engine output speed higher than the aforesaid second level provided the vehicle speed detected by the second vehicle speed sensor is lower than the second level or the throttle valve opening degree detected by the aforesaid one one of the throttle-valve position sensors is lower than the predetermined one of the aforesaid values.

Still alternatively, the throttle-valve responsive means may comprise a throttle-valve position sensor responsive to a throttle valve opening degree of a predetermined value, wherein the control circuit further comprises a first vehicle speed sensor responsive to a vehicle speed of a predetermined first level, a second vehicle speed sensor responsive to a predetermined second level lower than the first level, a brake sensor responsive to a a condition in which brakes are being applied, an accelerator pedal sensor responsive to a released condition of the accelerator pedal, and a gear position sensor responsive to the gear positions shiftable in the power transmission system, all of the aforesaid sensors being electrically connected to the first valve unit and operative to actuate the first valve unit into the second condition thereof producing the fully coupled condition in the clutch assembly in response to a vehicle speed lower than the aforesaid second level, to a lower forward-drive gear position or reverse-drive gear position selected in the transmission system and to the released condition of the accelerator pedal, in response to a vehicle speed lower than the aforesaid first level, to a lower forward-drive or reverse-drive gear position and to the condition in which brakes are being applied and to the released condition of the accelerator pedal, or in response to a vehicle speed lower than the aforesaid first level, to a higher forward-drive or reverse-drive gear position selected in the transmission system and to a throttle valve opening degree smaller than the aforesaid predetermined value.

As a further alternative, the control circuit may comprise a plurality of engine speed sensors responsive to engine output speeds of different levels and electrically connected to the third valve unit, each of the engine speed sensors being operative to actuate the third valve unit into the second condition thereof for a predetermined period of time in response to an engine output speed exceeding the particular level which is predetermined for the sensor.

BRIEF DESCRIPTION OF THE DRAWINGS

The features and advantages of a clutch control apparatus according to the present invention will become more apparent from the following description taken in conjunction with the accompanying drawings, in which:

FIGS. 8, 9 and 10 are diagrams which show preferred examples of the circuit arrangements incorporated into a control circuit forming part of the embodiment of FIG. 7;

In the various views showing the embodiments of the present invention or the parts or circuit arrangement of the embodiments, like reference numerals and characters designate similar parts, members, elements and units.

DESCRIPTION OF THE PREFERRED EMBODIMENTS

Figure 1:
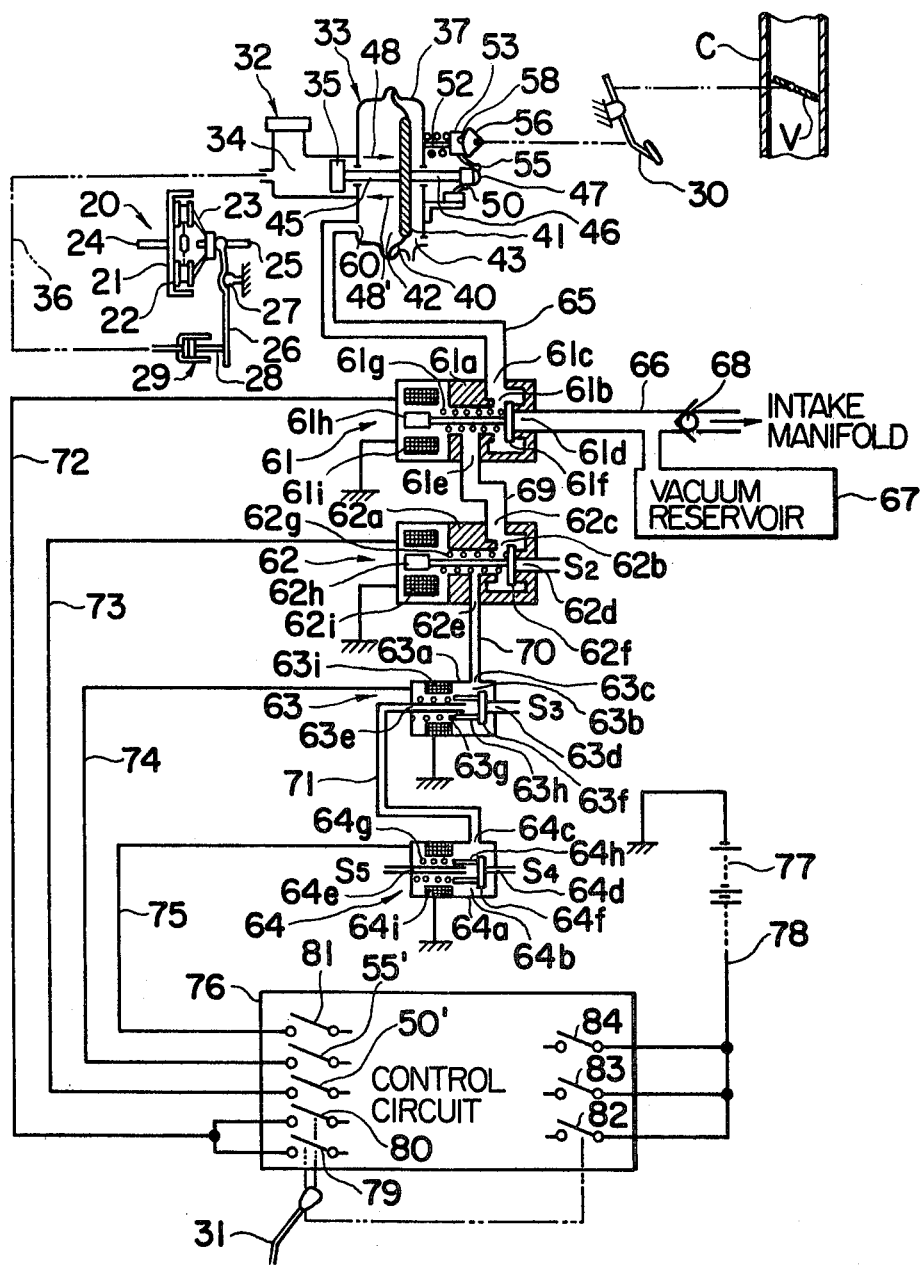
FIG. 1 is a sectional view, partly in block form, of a preferred embodiment of a clutch control apparatus according to the present invention.

Referring to the drawings, first to FIG. 1, a clutch assembly 20 for use in an automotive driveline is schematically shown, by way of example, to be of the single-plate dry-disc friction type comprising a flywheel 21, a friction disc 22 and a spring loaded pressure plate 23. The flywheel 21 is rotatable with the crankshaft, partly shown at 24, of the engine while the friction disc 22 and the pressure plate 23 are rotatable with and axially movable on the transmission input shaft, a portion of which is shown at 25. A clutch actuating lever 26 is rotatable about a pivot 27 and is pivotally connected at one end to the pressure plate 23 of the clutch assembly 20 and at the other end to a piston 28 of a fluid-operated clutch actuating cylinder 29. The pressure plate 23 is biased by a spring action to hold the friction disc 22 in pressing engagement with the flywheel 21 and thus hold the clutch assembly 20 in coupled condition and is moved against the spring action to move the friction disc 22 out of engagement with the flywheel 21 and thus actuate the clutch assembly 20 into uncoupled condition when a fluid pressure is developed in the cylinder 29 and causes the clutch actuating lever 26 to turn counterclockwise of the drawing about the pivot 27. The details of the construction and arrangement of the clutch assembly 20 and the associated actuating mechanism being well known in the art and being rather immaterial for the understanding of the present invention, no further description regarding the same will be unnecessary. Furthermore, the shown construction of the clutch assembly 20 is merely for the purpose of illustration and it will be understood, as the description proceeds, that the apparatus according to the present invention is applicable to any other type of clutch assembly ordinarily used in a driveline of an automotive vehicle. In FIG. 1, there are further shown an accelerator pedal 30 (in an upper right part of the drawing) and a transmission gear shift lever 31 (at the bottom of the drawing). As schematically illustrated in FIG. 1 the accelerator pedal 30 is connected by a mechanical linkage to the throttle valve v of a mixture supply system such as a carburetor of the engine for controlling the flow of air-fuel mixture (if the mixture supply system is of a carburetor type) or the flow of air (if the mixture supply system is of a fuel injection type) to be delivered into the intake manifold (not shown) of the engine, as is well known. The transmission gear shift lever 31 forms part of a manually-operated power transmission system of the vehicle and is adapted to be manually operated to effect shift between the gear positions in the transmission system. The transmission system is assumed, by way of example, to be of the type having four forward-drive gear positions (hereinafter referred to as first, second, third and fourth forward-drive gear positions providing gear ratios which are lower in this sequence), one reverse-drive gear position and a neutral position with none of the gear-train members held or driven.

Figure 2:
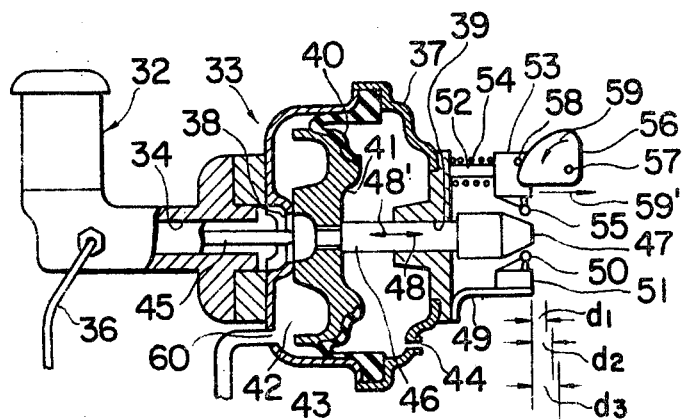
FIG. 2 is a sectional view showing, to an enlarged scale, a clutch actuating mechanism forming part of the embodiment illustrated in FIG. 1.

Now, an apparatus embodying the present invention comprises a master cylinder 32 and a vacuum-operated servo motor 33. The master cylinder 32 has a cylinder chamber 34 in which a piston 35 is axially movable back and forth. The cylinder chamber 34 is in communication with the above described clutch actuating cylinder 29 through a fluid passageway 36. On the other hand, the servo motor 33 comprises, as will be seen more clearly from FIG. 2, a hollow casing 37 fixedly connected to the master cylinder 32 and formed with apertures 38 and 39 which are aligned with the cylinder chamber 34 in the master cylinder 32. The casing 37 has mounted therein an annular diaphragm element 40 which is secured along its outer circumferential end to the inner peripheral surface of the casing. The diaphragm element 40 is, in turn, connected along its inner circumferential end to a piston 41 and, thus, divides the internal space of the casing 37 into two complementarily contractable and expansible chambers 42 and 43 which will be hereinafter referred to as control and atmospheric chambers, respectively. The casing 37 is further formed with a vent 44 through which the atmospheric chamber 43 is constantly open to the atmosphere. The above mentioned piston 41 is connected to the piston 35 (FIG. 1) in the master cylinder 32 by a connecting rod 45 extending from one face of the piston 41 into the cylinder chamber 34 through the control chamber 42 and the aperture 38 in the casing 37. A switch actuating plunger 46 extends from the other face of the piston 41 and axially projects out of the casing 37 through the atmospheric chamber 43 and the aperture 39 in the casing 37. The plunger 46 has secured to its projecting end portion a tapered contact breaker 47 of dielectric material. The rod 45 and the plunger 46 are axially movable through the apertures 38 and 39, respectively, as the piston 41 is axially moved in the directions of arrowheads 48 and 48'. viz., rightwardly and leftwardly of FIGS. 1 and 2 between the apertures 38 and 39 with the diaphragm element 40 flexibly deformed accordingly. When the control chamber 42 is expanded and the piston 41 is moved in the direction of the arrowhead 48, the fluid pressure in the master cylinder 32 and accordingly in the clutch actuating cylinder 29 is reduced and allows the clutch assembly 20 to couple by the spring force acting on the pressure plate 23 of the clutch assembly 20. The clutch assembly 20 is thus held in the fully coupled condition when the control chamber 42 of the servo motor 33 is expanded into a maximum-volume condition with the switch actuating plunger 46 held in a foremost axial position relative to the casing 37 as illustrated in FIG. 1. When, conversely, the control chamber 42 is contracted and the piston 41 is moved in the direction of the arrowhead 48', the fluid pressure in the master cylinder 32 and accordingly in the clutch actuating cylinder 29 is increased by the piston 35 of the master cylinder 32 so that the clutch assembly 20 is driven to be uncoupled against the spring force acting on the pressure plate 23 of the clutch assembly 20 by means of the clutch actuating lever 26. The clutch assembly 20 is held in the fully coupled condition when the control chamber 42 of the servo motor 33 is contracted into a minimum-volume condition with the switch actuating plunger 46 held in a rearmost axial position relative to the casing 37 as illustrated in FIG. 2. The piston 41 and the switch actuating plunger 46 are biased to move in the direction of the arrowhead 48 by the fluid pressure acting on the piston 35 in the master cylinder 32.

As is well known in the art, a clutch assembly is usually so arranged as to be progressively coupled and uncoupled from the fully coupled and fully coupled conditions, respectively. When, thus, the clutch assembly 20 is initiated into action to couple from the fully uncoupled condition, there is a certain amount of time interval before engagement is produced in the clutch assembly. Such a time interval is herein referred to as an allowance disengagement range of the clutch operation. The allowance disengagement range of the clutch operation is, in the arrangement of FIG. 1, in correspondence with a certain range of displacement of the switch actuating plunger 46 of the servo motor 33. The particular range of the plunger displacement is herein referred to as the allowance disengagement range of the plunger 46. At the end of the allowance disengagement range of the switch actuating plunger 46 moved in the direction of the arrowhead 48, the clutch assembly 20 is permitted to couple. The instant at which engagement is initially produced in the clutch assembly 20 is herein referred to as initial engagement point (IEP) in the movement of the switch actuating plunger 46. For some time after the switch actuating plunger 46 is moved in the direction of the arrowhead 48 past the above mentioned initial engagement point, the driving and driven members of the clutch assembly 20, viz., the flywheel 21 and the friction disc 22 are allowed to slide on each other and are therefore unable to transmit torque therebetween at a 100 percent efficiency. The range of displacement of the switch actuating plunger 46 providing such a condition is herein called a partial torque transmission range. When the switch actuating plunger 46 is being moved within the partial torque transmission range, the torque transmitted from the driving member or flywheel 21 to the driven member or friction disc 22 in the clutch assembly 20 increases progressively as the plunger 46 is moved in the direction of the arrowhead 48. At the end of the partial torque transmission range of the plunger displacement, the clutch assembly 20 is fully coupled and is thus enabled to transmit torque therethrough substantially at a 100 percent efficiency. The particular point of the plunger displacement is herein referred to as a full engagement point (FEP). The full engagement point of the plunger displacement is assumed to correspond to the previously mentioned foremost axial position of the plunger 46 but, if desired, there may be provided a slight allowance between the full engagement point and the foremost axial position of the plunger 46 so as to assure slip-free engagement between the driving and driven members of the clutch assembly 20. In contrast to the full engagement point of the plunger 46 as above defined, the point of displacement of the plunger 46 in correspondence with the previously mentioned rearmost axial position of the plunger is herein called the full disengagement point (EDP) in the movement of the plunger.

The casing 37 of the servo motor 33 has fixedly mounted thereon a bracket 49 which supports a pair of stationary contact elements 50 through an insulating member 51. The stationary contact elements 50 are biased, either by the elasticity of their own or by suitable biasing means engaging therewith, to be in contact with each other for providing electrical connection therebetween and are located to be engageable with the contact breaker 47 on the switch actuating plunger 46 as the plunger 46 is moved back and forth together with the piston 41. When the switch actuating plunger 46 is moved in the direction of the arrowhead 48' and is stopped in its rearmost axial position relative to the casing 37 as illustrated in FIG. 2, the contact breaker 47 on the plunger 46 is located rearwardly of the contact elements 50, which are consequently allowed to be in contact with each other and thus establish electrical connection therebetween. When the plunger 46 is moved in the direction of the arrowhead 48 into an intermediate axial position at a predetermined distance $d_1$ from the rearmost axial position thereof, the contact breaker 47 on the plunger 46 is brought into pressing engagement with the contact elements 50, which are consequently forced to be spaced apart and electrically disconnected from each other with the insulating contact breaker 47 interposed therebetween. The contact elements 50 are held in these conditions as long as the switch actuating plunger 46 is located between the above mentioned intermediate axial position and its foremost axial position relative to the casing 37 as illustrated in FIG. 2. The plunger 46, contact breaker 47 and stationary contact elements 50 are arranged so that the distance $d_1$ of movement of the plunger 46 from the rearmost axial position thereof corresponds to the previously mentioned allowance disengagement range of the plunger. The electrical connection between the contact elements 50 is thus interrupted when the switch actuating plunger 46 reaches the previously mentioned initial engagement point.

The casing 37 of the servo motor 33 has further fixedly mounted thereon a guide rod 52 extending in parallel with the contact breaker 47 on the switch actuating plunger 46. A movable contact carrier 53 is supported on the guide rod 52 and is movable along the guide rod 52 toward and away from the casing 37. The contact carrier 53 is urged to move away from the casing 37 by suitable biasing means such as a helical compression spring 54 seated between the casing 37 and the contact carrier 53 as shown. The contact carrier 53 has supported thereon a pair of movable contact elements 55 which are movable with the contact carrier 53 in parallel with the contact breaker 47 on the switch actuating plunger 46 and which are engageable with the contact breaker 47 as the contact breaker 47 and the contact carrier 53 are moved relative to each other. Similarly to the stationary contact elements 50, the movable contact elements 55 are biased either by the elasticity of their own or by suitable biasing means engaging therewith to be in contact with each other for providing electrical connection therebetween and are forced to be spaced apart from each other when the switch actuating plunger 46 and the contact carrier 53 are moved into relative positions having the contact breaker 47 pressed between the contact elements 55 as will be seen from FIG. 1. A sector cam 56 having a quadrant cam lobe is rotatable on a stationary shaft 57 which has an axis substantially perpendicular to an extension of the axis of the guide rod 52 and which is fixed to a suitable stationary structural member (not shown). A pin 58 projects from the contact carrier 53 and is located to be engageable with the quadrant cam lobe of the sector cam 56. The pin 58 is constantly forced against the quadrant cam lobe of the sector cam 56 by the force exerted on the contact carrier 53 by the compression spring 54. When the sector cam 56 is in an angular position (hereinafter called an initial angular position of the cam) having one end portion of its quadrant cam lobe in contact with the pin 58 on the contact carrier 53 as illustrated in FIG. 2, the contact carrier 53 is in a position closest to the casing 37 of the servo motor 33. Under these conditions, the movable contact elements 55 on the contact carrier 53 are located similarly to the stationary contact elements 50 with respect to the casing 37 and accordingly to the contact breaker 47 on the switch actuating plunger 46 so that the movable contact elements 55 are open if the stationary contact elements 50 are open. As the sector cam 56 is rotated about the shaft 57 from the above mentioned initial angular position in a direction indicated by an arrow 59, the pin 58 slides on the cam lobe of the sector cam 56 and allows the contact carrier 53 to move away from the casing 37, viz., in a direction of arrow 59' parallel with the axis of the contact breaker 47 as will be seen from FIG. 1. The movable contact elements 55 are consequently moved in the direction of the arrow 59' with respect to the contact breaker 47. The sector cam 56 thus arranged is operatively connected to the accelerator pedal 30 by a suitable mechanical linkage (not shown) and is held in the above mentioned initial angular position when the accelerator pedal 30 is in a released condition. When the accelerator pedal 30 is depressed from the released condition, the sector cam 56 is driven to turn about the shaft 57 in the direction of the arrow 59 and produces variation in the positional relationship between the contact breaker 47 on the switch actuating plunger 46 and the movable contact elements 55 on the contact carrier 53.

The casing 37 of the servo motor 33 is formed with a port 60 through which the control chamber 42 in the casing 37 is selectively brougtht into communication with a source of vacuum or with the open air under the control of a valve arrangement which comprises first, second, third and fourth solenoid-operated two-position valve units 61, 62, 63 and 64 as shown in FIG. 1.

The first valve unit 61 comprises a casing 61a formed with a valve chamber 61b and first, second and third ports 61c, 61d and 61e. The first port 61c is in constant communication with the port 60 in the casing 37 of the servo motor 33 through a passageway 65. The second port 61d is in communication with a suitable source of vacuum such as for example the intake manifold (not shown) of the engine through a passageway 66 provided with a vacuum reservoir 67 and a one-way check valve 68 located upstream of the reservoir 67. A valve element 61f is movable within the valve chamber 61b between a first position closing the second port 61d and a second position closing the third port 61e. When the valve element 61f is in the first position, communication is provided between the first and third ports 61c and 61e through the valve chamber 61b which is isolated from the second port 61d by the valve element 61f, as illustrated in FIG. 1. When the valve element 61f is in the second position thereof, communication is established between the first and second ports 61c and 61d through the valve chamber 61b which is isolated from the third port 61e by the valve element 61f. The valve element 61f is urged to move toward the first position thereof by suitable biasing means such as a helical compression spring 61g seated at one end on the valve element 61f as shown. The valve element 61f is connected to a solenoidoperated plunger 61h which is partly surrounded by an exciting coil 61i and which is movable back and forth when the coil 61i is energized and de-energized. The plunger 61h is assumed to be in a position allowing the valve element 61f to be held in the first position thereof by the biasing force of the compression spring 61g when the solenoid coil 61i remains the de-energized. When the exciting coil 61i is energized, the plunger 61h is moved in a direction to move the valve element 61f from the first position into the second position thereof against the force of the spring 61g. The first valve unit 61 is, thus, adapted to provide communication between the first and third ports 61c and 61e thereof when the exciting coil 61i is de-energized and between the first and second ports 61c and 61d thereof when the exciting coil 61i is energized.

The second, third and fourth valve units 62, 63 and 64 are constructed essentially similarly to the above described first valve unit 61. The second valve unit 62 thus comprises a casing 62a formed with a valve chamber 62b and first, second and third ports 62c, 62d and 62e; a valve element 62f movalbe within the valve chamber 62b; a helical compression spring 62g acting on the valve element 62f; a solenoid-operated plunger 62h connected to the valve element 62f; and an exciting coil 62i for operating the plunger 62h. The first port 62c is in constant communnication with the third port 61e of the first valve unit 61 through a passageway 69 and the second port 62d is open to the atmosphere. The valve element 62f is movable between a first position closing the second port 62d and a second position closing the third port 62e and is biased to move toward the first position thereof by the compression spring 62g. When the valve element 62f is in the first position thereof, communication is provided between the first and third ports 62c and 62d through the valve chamber 62b which is isolated from the second port 62d by the valve element 62f, as illustrated in FIG. 1. When the valve element 62f is in the second position thereof, communication is established between the first and second ports 62c and 62d through the valve chamber 62b which is isolated from the third port 62e by the valve element 62f. The valve element 62f is allowed to be in the first position thereof by the force of the compression spring 62g when the exciting coil 62i is de-energized and is moved from the first position into the second position thereof against the force of the spring 62g when the exciting coil 62i is energized. The second valve unit 62 is thus adapted to provide communication between the first and third ports 62c and 62e thereof when the exciting coil 62i is de-energized and between the first and second ports 62c and 62d when the exciting coil 62i is energized.

The third valve unit 63 comprises a casing 63a formed with a valve chamber 63b and first, second and third ports 63c, 63d and 63e; a valve element 63f movable within the valve chamber 63b; a helical compression spring 63g acting on the valve element 63f; a solenoid-operated hollow plunger 63h connected to the valve element 63f; and an exciting coil 63i for operating the plunger 63h. The first port 63c, is in constant communication with the third port 62e of the second valve unit 62 through a passageway 70 and the second port 63d is open to the atmosphere. The valve element 63f is movable between a first position closing the second port 63d and a second closing the third port 63e and is biased by the compression spring 63g to move toward the first position thereof. When the valve element 63f is in the first position thereof, communication is provided between the first and third ports 63c and 63e through the valve chamber 63b which is isolated from the second port 63d by the valve element 63f, as illustrated in FIG. 1. When the valve element 63f is in the second position thereof, communication is established between the first and second ports 63c and 63d through the valve chamber 63b which is isolated from the third port 63e by the valve element 63f. The valve element 63f is allowed to be in the first position thereof by the force of the compression spring 63g when the exciting coil 63i is de-energized and is moved from the first position into the second position thereof against the force of the spring 63g when the exciting coil 63i is energized. The third valve unit 63 is thus adapted to provede communication between the first and third ports 63c and 63e thereof when the exciting coil 63i is de-energized and between the first and second ports 63c and 63d thereof when the exciting coil 63i is energized.

The fourth valve units 64 comprises a casing 64a formed with a valve chamber 64b and first, second and third ports 64c, 64d and 64e; a valve element 64f, movable within the valve chamber 64b; a helical compression spring 64g acting on the valve element 64f; a solenoid-operated hollow plunger 64h connected to the valve element 64f; and an exciting coil 64i for operating the plunger 64h. The first port 64c is in constant communication with the third port 63e of the third valve unit 63 through a passageway 71 while the second and third ports 64d and 64e are open to the atmosphere. The valve element 64f is movable between a first position closing the second port 64d and a second position closing the third port 64e and is biased by the compression spring 64g to move toward the first position thereof. When the valve element 64f is in the first position thereof, communication is provided between the first and third ports 64c and 64e through the valve chamber 64b which is isolated from the second port 64d by the valve element 64f, as illustrated in FIG. 1. When the valve element 64f is in the second position thereof, communication is established between the first and second ports 64c and 64d through the valve chamber 64b which is isolated from the third port 64e by the valve element 64f. The valve element 64f is allowed to be in the first position thereof by the force of the compression spring 64g when the exciting coil 64i is de-energized and is moved from the first position into the second position thereof against the force of the spring 64g when the exciting coil 64i is energized. The fourth valve unit 64 is thus adapted to provide communication between the first and third ports 64c and 64e thereof when the exciting coil 64i is de-energized and between the first and second ports 64c and 64d thereof when the exciting coil 64i is energized.

In the valve arrangement above described, the respective second ports 62d, 63d and 64d of the second, third and fourth valve units 62, 63 and 64 are calibrated so that the effective sectional area of the second port 63d of the third valve unit 63 is smaller than the effective sectional area of the second port 62d of the second valve unit 62 but is larger than the effective sectional area of the second port 64d of the fourth valve unit 64. If, thus, the effective sectional areas of the ports 62d, 63d and 64d of the second, third and fourth valve units 62, 63 and 64 are denoted by $S_2$, $S_3$ and $S_4$, then the following relationship holds therebetween:

$$S_4 < S_3 < S_2.$$

Furthermore, the third port 64e of the fourth valve unit 64 is sized to have an effective sectional area $S_5$ smaller than the sectional area $S_3$ of the port 63d of the third valve unit 63 but larger than the sectional area $S_4$ of the second port 64d of the fourth valve unit 64, hence $$S_4 < S_5 < S_3.$$

On a practical basis, the second ports 62d, 63d and 64d of the second, third and fourth valve units 62, 63 and 64 may measure about 5 mm, 1.2 mm and 0.3 mm, respectively, in diameter while the third port 64e of the fourth valve unit 64 may measure about 0.6 mm in diameter. The flow rates of air through the respective second ports 62d, 63d and 64d of the second, third and fourth valve units 62, 63 and 64 are represented by $f_1$, $f_2$ and $f_3$, respectively, and the flow rate of air through the third port 64e of the fourth valve unit 64 is represented by $f_5$. From the above discussion it is apparent that the following relation holds between these flow rates:

$f_4 < f_5 < f_3 < f_2.$

The first and third ports 61c and 61e of the first valve unit 61, the first port 62c of the second valve unit 62, the passageways 65 and 69 and the port 60 of the servo motor 33 are sized to have respective sectional areas which are substantially equal to or slightly larger than the sectional area $S_2$ of the second port 62d of the second valve unit 62.

The exciting coils 61i, 62i, 63i and 64i of the valve units 61, 62, 63 and 64 are connected by lines 72, 73, 74 and 75, respectively, to a control circuit 76, which is in turn connected to the positive terminal of a d.c. power source 77 by a positive d.c. bus line 78. The control circuit 76 comprises first and second switch means connected in parallel to the exciting coil 61i of the first valve unit 61 through the line 72 and third, fourth and fifth switch means which are connected to the exciting coils 62i, 63i and 64i of the second, third and fourth valve units 62, 63 and 64 through the lines 73, 74 and 75, respectively. The first switch means comprises a shift-on switch 79 which is arranged in association with the transmission gear shift lever 31 for being closed when the shift lever 31 is being touched by an operator. The second switch means comprises a neutral-off switch 80 which is also arranged in conjunction with the transmission gear shift lever 31 but which is adapted to open when the shift lever 31 is in neutral position. The third and fourth switch means comprise stationary- and movable-contact switches 50' and 55', respectively. The stationary-contact switch 50' is constituted by the previously described stationary contacts 50 on the servo motor 33 and is thus open when the switch actuating plunger 46 of the servo motor 33 is moved through a distance longer than the predetermined distance $d_1$ from its rearmost axial position, viz., when the clutch assembly 20 is driven beyond the previously mentioned initial engagement point IEP. The movable-contact switch 55' is constituted by the movable contacts 55 on the servo motor 33 and is thus open when the switch control plunger 46 is in an axial position having the contact breaker 47 forced into engagement with the movable contact elements 55 which are movable with the accelerator pedal 30. The fifth switch means associated with the fifth valve unit 64i comprises a throttle-responsive switch 81 which is arranged in conjunction with the throttle valve 2 of the mixture supply system of the engine or with the accelerator pedal 30 for being closed when the throttle valve is open with a degree less than a predetermined value which is herein assumed, by way of example, to be approximately one eighth of the fully opening degree of the throttle valve. The control circuit 76 further comprises sixth, seventh and eighth switch means. The sixth switch means comprises a gear-position switch 82 which is arranged in conjunction with the transmission gear shift lever 31 so as to be open in response to the first or second forward-drive gear position or the reverse-drive gear position selected in the transmission system and to close in response to the third or fourth forward-drive gear position selected in the transmission system. The seventh switch means comprises an idling-on switch 83 which is adapted to be normally open and to close in response to idling condition of the engine. The eighth switch means comprises a vehicle-speed-responsive switch 84 which is open in response to a vehicle speed higher than a predetermined limit which is herein assumed, by way of example, to be approximately 15 killometers per hour. The vehicle-speed switch 84 is thus closed when the vehicle speed is lower than approximately 15 killometers per hour.

Figure 3:
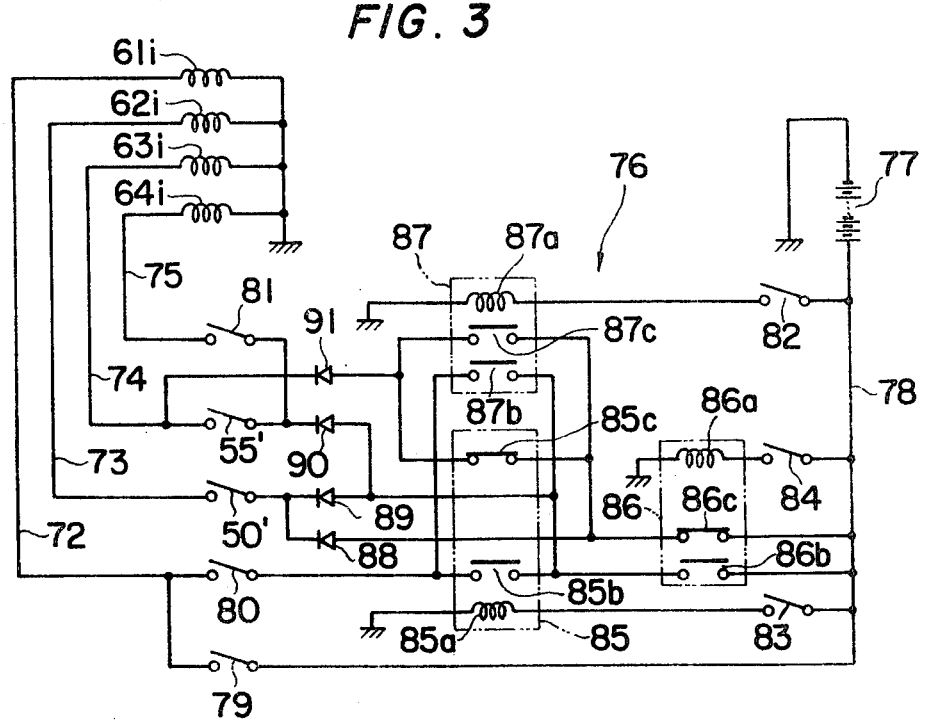
FIG. 3 is a view showing a circuit arrangement of a control circuit of the embodiment of FIG. 1.

Turning to FIG. 3, the control circuit 76 further comprises first, second and third relays 85, 86 and 87. The first relay 85 comprises a coil 85a and normally-open and normally-closed first and second contact sets 85b and 85c, respectively. The coil 85a of the first relay 85 is grounded at one end and is connected at the other to the positive d.c. bus line 78 across the idling-on switch 83. The first relay 85 thus depends for its operation on the action of the idling-on switch 83. The second relay 86 comprises a coil 86a and normally-open and normally-closed first and second contact sets 86b and 86c, respectively. The coil 86a of the second relay 86 is grounded at one end and is connected at the other end to the positive d.c. bus line 78 across the vehicle-speed switch 84. The second relay 86 thus depends for its operation on the action of the vehicle-speed-responsive switch 84. The third relay 87 comprises a coil 87a and normally-open first and second contact sets 87b and 87c. The coil 87a of the third relay 87 is grounded at one end and is connected at the other end to the positive d.c. bus line 78 across the gear-position switch 82. The third relay 87 thus depends for its operation on the action of the gear-position switch 82. The normally-open first contact set 85b of the first relay 85 is connected in parallel with the second contact set 87b of the third relay 87 between the neutral-off switch 80 and the normally-open first contact set 86b of the second relay 86 and, across the switch 80 and the contact set 86b between the line 72 and the positive d.c. bus line 78 in parallel with the shift-on switch 79, as shown. The exciting coil 61i of the first valve unit 61 (FIG. 1) is thus energized from the d.c. power source 77 when (1) the shift-on switch 79 is closed with the transmission gear shift lever 31 being manipulated by the operator, (2) the neutral-off switch 80 and the vehicle-speed switch 84 are closed with the shift lever 31 in an off-neutral position and with the vehicle speed lower than approximately 15 killometers per hour and, simultaneously, the idling-on switch 83 is closed with the engine operating at idle or (3) the neutral-off and vehicle-speed switches 80 and 84 are closed as in the condition (2) and, simultaneously, the gear-position switch 82 is closed with the gear shift lever 31 in the third or fourth forward-drive gear position. The first and second contact sets 86b and 86c of the second relay 86 are connected in parallel with each other between the line 73 and the positive d.c. bus line 78 through diodes 88 and 89, respectively, across the stationary-contact switch 50'. The diodes 88 and 89 have their cathode electrodes commonly connected to the line 73 across the stationary-contact switch 50' and their anode electrodes connected to the bus line 78 across the second and first contact sets 86c and 86b, respectively, of the second relay 86. The exciting coil 62i of the second velve unit 62 is thus energized from the d.c. power source 77 irrespective of the condition of the vehicle-speed switch 84 when (4) the stationary-contact switch 50' is closed under the condition in which the switch actuating plunger 46 of the servo motor 33 (FIG. 1) is in a position within the previously defined allowance disengagement range. The normally-open first contact set 86b of the second relay 86 is further connected between the line 74 and the positive d.c. bus line 78 through a diode 90 across the movable-contact switch 55'. The diode 90 has its cathode electrode connected to the line 74 across the movable-contact switch 55' and its anode electrode connected to the bus line 78 across the first contact set 86b of the second relay 86. The second contact set 85c of the first relay 85 and the second contact set 87c of the third relay 87 are connected in parallel with each other between the line 74 and the positive d.c. bus line 78 through a diode 91 across the normally-closed second contact set 86c of the second relay 86 as shown. The diode 91 has its cathode electrode directly connected to the line 74 and its anode electrode connected to the bus line 78 across the parallel combination of the respective second contact sets 85c and 87c of the first and third relays 85 and 87 and across the second contact set 86c of the second relay 86. The exciting coil 63i of the third valve unit 63 (FIG. 1) is thus energized from the d.c. power source 77 when (5) the movable-contact switch 55' is closed and simultaneously the vehicle-speed switch 84 is closed in response to a vehicle speed lower than approximately 15 killometers per hour, (6) the vehicle-speed switch 84 is open in response to a vehicle speed higher than the above mentioned level and simultaneously the idling-on switch 83 is open with the engine operating in a part or full throttle condition or (7) the vehicle-speed switch 84 is open as in the above described condition (6) and simultaneously the gear-position switch 82 is closed with the transmission gear shift lever 31 (FIG. 1) in the third or fourth forward-drive gear position. The throttle-responsive switch 81 is connected between the line 75 and the positive d.c. bus line 78 through the above mentioned diode 90 and across the normally-open first contact set 86b of the second relay 86 as shown. The exciting coil 64i of the fourth valve unit 64 (FIG. 1) is thus energized from the d.c. power source 77 when (8) both the throttle-responsive switch 81 and the vehicle-speed switch 84 are closed under a condition in which the carburetor throttle valve is in a part throttle position providing an opening degree less than one eighth of the fully opening degree of the valve while the vehicle is running at a speed lower than approximately 15 killometers per hour.

The operation of the clutch assembly 20 and the clutch control apparatus thus constructed and arranged will be hereinafter described with concurrent reference to FIGS. 1 to 3 and further to FIGS. 4A and 4B which show the motions of the switch actuating plunger 46 of the servo motor 33 when the clutch assembly 20 is being operated to be coupled and uncoupled.

When the transmission gear shift lever 31 is held in the neutral position, both the shift-on switch 79 and the neutral-off switch 80 are kept open and maintain the line 72 disconnected from the d.c. power source 77. The exciting coil 61i of the first valve unit 61 is therefore kept de-energized and accordingly the valve element 61f of the valve unit 61 is held in its first position closing the second port 61d by the force of the compression spring 61g, providing communication between the first and third ports 61c and 61e of the valve unit 61 as shown in FIG. 1. Under these conditions, the control chamber 42 of the servo motor 33 is vented from the open air through the passageway 65, the first and third ports 61c and 61e of the first valve unit 61 and either the respective second port 62d or 63d of the second or third valve unit 62 or 63 or the second or third port 64d or 6e of the fourth valve unit 64 as the case may be. The control chamber 42 of the servo motor 33 is therefore allowed to fully expand and accordingly the switch actuating plunger 46 is moved into its foremost axial position as illustrated in FIG. 1 with the result that the clutch assembly 20 is held in a fully coupled condition. The switch actuating plunger 46 being thus positioned at the full engagement point, both the stationary contact elements 50 and the movable contact elements 55 on the servo motor 33 are spaced apart from each other by the contact breaker 47 on the switch actuating plunger 46 so that the stationary-contact switch 50' and the movable contact switch 55' are held open.

If the transmission gear shift lever 31 is operated under these conditions, the shift-on switch 79 of the control circuit 76 is closed and provides connection between the line 72 and the positive d.c. bus line 78 through the shift-on switch 79, thereby establishing the previously described condition (1). The exciting coil 61i of the first valve unit 61 is therefore energized from the d.c. power source 77 so that the valve element 61f is moved against the force of the compression spring 61g into its second position blocking the communication between the valve chamber 61b and the third port 61e and providing communication between the first and second ports 61c and 61d through the valve chamber 61b. The vacuum passageway 66 leading from the engine intake manifold is now allowed to communicate with the control chamber 42 of the servo motor 33 through the second and first ports 61d and 61c of the valve unit 61 and the passageway 65 so that air in the control chamber 42 is drawn into the vacuum passageway 66. Vacuum is now developed in the control chamber 42, which consequently is caused to contract to move the piston 35 of the master cylinder 32 to move in the cylinder chamber 34 in a direction to cause the clutch assembly 20 to be uncoupled. When the clutch assembly 20 is fully uncoupled, the switch actuating plunger 46 of the servo motor 33 is moved into its rearmost axial position and has the contact breaker 47 disengaged from both the stationary contact elements 50 and the movable contact elements 55. The displacement of the switch actuating plunger 46 thus moved from the full engagement point FEP to the full disengagement point FDP is indicated by line A-B of the plot shown in FIG. 4A.

The clutch assembly 20 being thus held in the fully uncoupled condition, the transmission system is ready to be shifted from neutral. If the transmission gear shift lever 31 is shifted into the first or second forward-drive gear position or into the reverse-drive gear position and if the vehicle is held at a halt with the engine operating at idle, the gear-position switch 82 is open and the neutral-off switch 80, throttle-responsive switch 81, idling-on switch 83 and vehicle-speed switch 84 are closed. The idling-on switch 83 and the vehicle-speed switch 84 being thus closed, the respective second contact sets 85b and 86b of the first and second relays 85 and 86 are closed and establish the previously described condition (2) providing connection between the line 72 and the positive d.c. bus line 78 through these contact sets 85b and 86b and the neutral-off switch 80, causing the exciting coil 61i of the first valve unit 61 to be energized from the d.c. power source 77. The first contact set 86b of the second relay 86 being closed, the previously described conditions (4), (5) and (8) are established so that connection is further provided between each of the lines 73, 74 and 75 and the positive d.c. bus line 78 through the contact set 86b and each of the stationary-contact switch 50', movable contact switch 55' and throttle-responsive switch 81, causing the respective exciting coils 62i, 63i and 64i of the second, third and fourth valve units 62, 63 and 64 to be energized from the d.c. power source 77. The stationary-contact and movable-contact switches 50' and 55' are closed with the switch actuating plunger 46 of the servo motor 33 held in the rearmost axial position thereof with the clutch assembly 20 in the fully uncoupled condition.

The exciting coils 61i to 64i of the first to fourth valve units 61 to 64 being energized from the power source 77, the valve elements 61f to 64f of the valve units 61 to 64 are all held in their respective second positions and establish communication between the respective first and second ports in each of the valve units 61 to 64. While the first valve unit 61 is thus maintained in a condition establishing vacuum in the control chamber 42 of the servo motor 33, each of the second to fourth valve units 62 to 64 is held in a condition having its respective first port 62c, 63c or 64c vented from the open air through its respective second port 62d, 63d or 64d and having its respective third port 62e, 63e or 64e closed by the valve element 62f, 63f or 64f. In this instance, the third port 61e of the first valve unit 61 is isolated from the valve chamber 61b of the valve unit 61 but is vented from the open air through the first and second ports 62c and 62d of the second valve unit 62. Likewise, the third port 62e of the second valve unit 62 is isolated from the valve chamber 62b of the valve unit 62 but is vented from the open air through the first and second ports 63c and 63d of the third valve unit 63, while the third port 63e of the third valve unit 63 is isolated from the valve chamber 63b of the valve unit 63 but is vented from the open air through the first and second ports 64c and 64d of the fourth valve unit 64. The third port 64e of the fourth valve unit 64 is isolated from the valve chamber 64b of the valve unit 64.

If the accelerator pedal 30 is depressed under these conditions in an attempt to start the vehicle from a halt, the idling-on switch 83 is made open and causes the first contact set 85b of the first relay 85 to open, disconnecting the line 72 from the positive d.c. bus line 78. The exciting coil 61i of the first valve unit 61 is now de-energized and the valve element 61f of the valve unit 61 is moved by the spring 61g into the first position thereof, closing the second port 61d and providing communication between the first and third ports 61c and 61e through the valve chamber 61b as seen in FIG. 1. The control chamber 42 of the servo motor 33 is consequently isolated from the vacuum passageway 66 and is brought into communication with the open air through the passageway 65, the first and third ports 61c and 61e of the valve unit 61, the passageway 70 and the first and second ports 62c and 62d of the second valve unit 62 now having its valve element 62f held in the second position closing the third port 62e of the valve unit 62. Atmospheric air is therefore drawn into the control chamber 42 of the servo motor 33 through the second port 62d of the second valve unit 62 at a rate $f_2$ which is dictated by the effective cross sectional area $S_2$ of the port 62d. The control chamber 42 is allowed to expand from the minimum-volume condition and accordingly the switch actuating plunger 46 is axially moved from its rearmost position at velocities which is proportional to the flow rate $f_2$ of air through the port 62d of the second valve unit 62. This movement of the switch actuating plunger 46 is indicated by line C-D in the plot shown in FIG. 4A. In FIG. 4A, line B-C indicates the condition in which the switch actuating plunger 46 is held in its rearmost axial position holding the clutch assembly 20 in the fully uncoupled condition.

While the switch actuating plunger 46 of the servo motor 33 is being moved away from the rearmost axial position thereof and is thus operative in the previously defined allowance disengagement range, the clutch assembly 20 is maintained in an uncoupled condition although the driven member or friction disc 22 thereof is being moved closer to the driving member or flywheel 21 of the clutch assembly. When, however, the switch actuating plunger 46 of the servo motor 33 is moved the predetermined distance $d_1$ from its rearmost axial position or the full disengagement point FDP thereof, the clutch 20 is initiated into coupled condition and becomes operative to transmit torque therethrough at a rate which continuously increases as the plunger 46 is moved through a distance over or more than the distance $d_1$.

At an instant the switch actuating plunger 46 of the servo motor 33 reaches the position spaced apart the predetermined distance $d_1$ from its initial position, the plunger 46 is brought into engagement with the stationary contact elements 50 on the servo motor 33 and forces the contact elements 50 to be spaced apart from each other by the contact breaker 47 interposed therebetween. The stationary-contact switch 50' of the control circuit 76 is now made open and disconnects the line 74 from the positive d.c. bus line 78, causing the exciting coil 62i of the second valve unit 62 to be de-energized. The valve element 62f of the second valve unit 62 is moved by the force of the compression spring 62g into the first position thereof closing the second port 62d of the valve unit 62 and providing communication between the first and third ports 62c and 62e of the valve unit 62 through the valve chamber 62b as seen in FIG. 1. The communication between the control chamber 42 of the servo motor 33 and the atmosphere is now provided through the passageway 65, the first and third ports 61c and 61e of the first valve unit 61, the passageway 69, the first and third ports 62c and 62e of the second valve unit 62, the passageway 70 and the first and second ports 63c and 63d of the third valve unit 63. The control chamber 42 of the servo motor 33 is therefore vented from the open air through the second port 63d of the third valve unit 63 so that atmospheric air is drawn into the control chamber 42 at a rate $f_3$ which is dictated by the effective sectional area $S_3$ of the port 63d. The control chamber 42 is expanded and accordingly the switch actuating plunger 46 is moved toward its foremost axial position at velocities which is proportional to the flow rate $f_3$ of air through the second port 63d of the third valve unit 63. Because, in this instance, the flow rate $f_3$ of air through the second port 63d of the third valve unit 63 is lower than the flow rate $f_2$ of air through the second port 62d of the second valve unit 62, the movement of the plunger 46 slows down when the plunger 46 is moved past the initial engagement point IEP as indicated by line D-E of the plot shown in FIG. 4A.

When the accelerator pedal 30 is depressed from the released position thereof, the sector cam 56 on the servo motor 33 is turned counter-clockwise of FIGS. 1 and 2 about the shaft 57 so that the movable contact carrier 53 on the guide rod 52 is moved away from the casing 37, viz., rightwardly of FIGS. 1 and 2 by the force of the compression spring 54 with the pin 58 on the contact carrier 53 in sliding engagement with the quadrant cam lobe of the sector cam 56. This causes the movable contact elements 55 on the contact carrier 53 to move away from the casing 53 in parallel with the direction of movement of the switch actuating plunger 46. The contact breaker 47 on the switch actuating plunger 46 is moved closer to the movable contact elements 55 as the plunger 46 is moved beyond the initial engagement point IEP.

If, in this instance, the distance of movement of the movable contact elements 55 from their initial positions is smaller than a predetermined distance $d_2$ corresponding to the distance of movement of the accelerator pedal 30 providing a throttle valve opening degree approximating one eighth of the fully opening degree of the throttle valve, the plunger 46 moved beyond the initial engagement point IEP is brought into engagment with the movable contact elements 55 and accordingly the movablecontact switch 55' of the control circuit 76 becomes open before the throttle-responsive switch 81 opens. When the stationarycontact switch 55' is thus made open, the line 74 is disconnected from the positive d.c. bus line 78 and the exciting coil 63i of the third valve unit 63 is de-energized. The valve element 63f the valve unit 63 is now moved by the force of the compression spring 63g into the first position thereof closing the second port 63d and providing communication between the first and third ports 63c and 63e of the valve unit 63 through the valve chamber 63b, as is seen in FIG. 1. The communication between the control chamber 42 of the servo motor 33 and the atmosphere is now provided through the passageway 65, the first and third ports 61c and 61e of the first valve unit 61, the passageway 69, the first and third ports 62c and 62e of the second valve unit 62, the passageway 70, the first and third ports 63c and 63e of the third valve unit 63, the passageway 71, and the first and second ports 64c and 64d of the fourth valve unit 64. The control chamber 42 is therefore vented from the open air through the second port 64d of the fourth valve unit 64 so that atmospheric air is admitted into the control chamber 42 at a rate $f_4$ which is dictated by the effective cross sectional area $S_4$ of the port 64d. The control chamber 42 is therefore expanded and accordingly the switch actuating plunger 46 is moved toward the foremost position thereof at velocities which is proportional to the flow rate $f_4$ of air through the second port 64d of the fourth valve unit 64. The flow rate $f_4$ of air through the second port 64d of the second valve unit 64 being lower than the flow rate $f_3$ of air through the second port 63d of the third valve unit 63, the movement of the plunger 46 in the partial torque transmission range is caused to further slow down as indicated by line E-F of the plot shown in FIG. 4A. The clutch assembly 20 is fully coupled when the switch actuating plunger 46 of the servo motor 33 thus moved in the partial torque transmission range reaches its foremost axial position, viz., the full engagement point FEP as indicated by point F in the plot of FIG. 4A.

If the accelerator pedal 30 is maintained in the released position when the switch actuating plunger 46 of the servo motor 33 is moved to the initial engagement point IEP, the movable contact switch 55' is made open simultaneously when the stationary-contact switch 50' is made open so that the exciting coils 62i and 63i of the second and third valve units 62 and 63 are de-energized concurrently. When this occurs, the condition in which the control chamber 42 of the servo motor 33 is vented through the port 62d of the second valve unit 62 is shited directly into the condition in which the control chamber 42 is vented from the port 64d of the fouth valve unit 64 so that the switch actuating plunger 46 is moved past the initial engagement point at velocities which is proportional to the flow rate $f_4$ of air through the port 64d of the fourth valve unit 64, as will be seen from line D-F' of the plot shown in FIG. 4A.

Figure 4A:
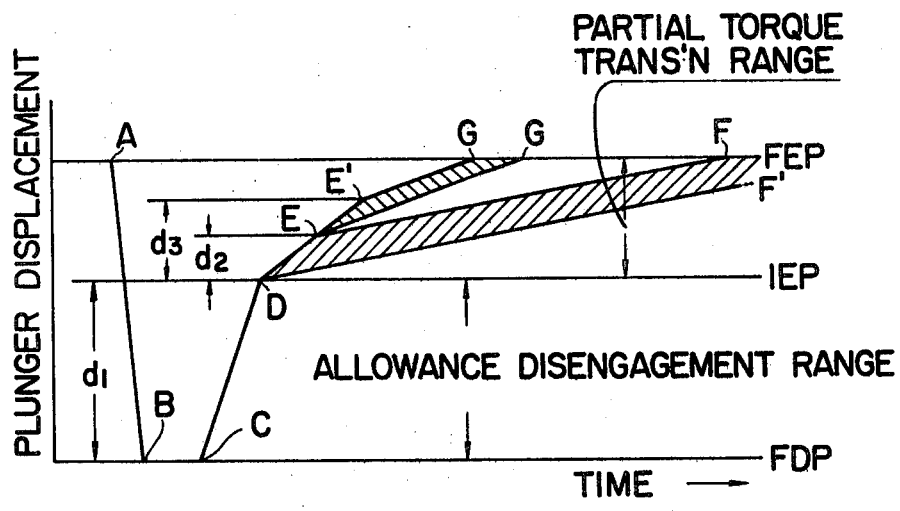
FIGS. 4A and 4B are graphs which show performance characteristics achievable in the clutch control apparatus of FIG. 1.
Figure 4B:
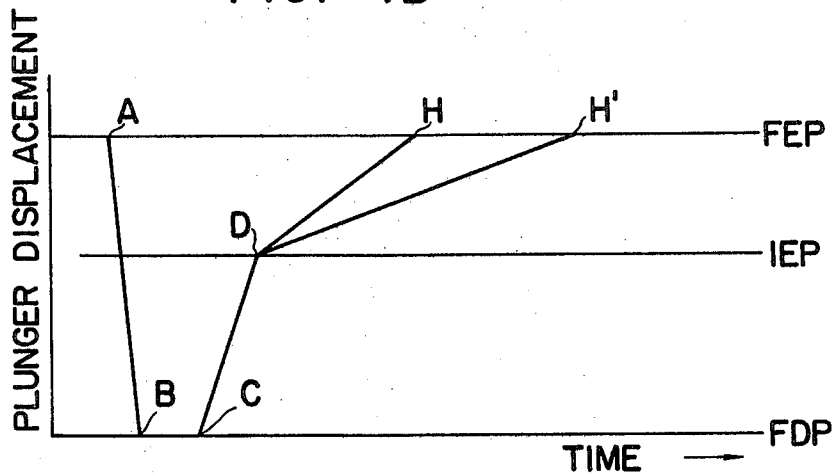

The movement of the switch actuating plunger 46 as indicated by the hatched area between the lines E-F and D-F' in FIG. 4A is achieved when the accelerator pedal 30 is depressed to such an extent as will provide a throttle valve opening degree less than one eighth of the fully opening degree of the throttle valve. If, however, the accelerator pedal 30 is depressed through a distance greater than such an extent, the throttle-responsive switch 81 of the control circuit 76 is made open so that the line 75 is diconnected from the positive d.c. bus line 78 and accordingly the exciting coil 64i of the fourth valve unit 64 is de-energized and allows the valve element 64f to be moved by the force of the compression spring 64g into the first position thereof closing the second port 64d and providing communication between the first and third ports 64c and 64e of the valve unit 64. If this takes place before the switch actuating plunger 46 is moved into engagement with the movable contact elements 55 which have been moved through a distance greater than the previously mentioned distance $d_2$ (see FIG. 4A) from their initial positions, then the third port 62e of the second valve unit 62 is brought into communication with the open air not through the second port 64d but through the third port 64e of the fourth valve unit 64 when the movable-contact switch 55' is made open and accordingly the third valve unit 63 is conditioned to provide communication between the first and third ports 63c and 63e thereof. Under these conditions, atmospheric air is drawn into the control chamber 42 of the servo motor 33 at a rate $f_5$ which is dictated by the effective sectional area $S_5$ of the third port 64e of the fourth valve unit 64. The control chamber 42 is therefore expanded and accordingly the switch actuating plunger 46 is moved in the partial torque transmission range at velocities which is proportional to the flow rate $f_5$ of air through the third port 64e of the fourth valve unit 64. The flow rate $f_5$ being higher than the flow rate $f_4$ of air through the second port 64d of the fourth valve unit 64 and lower than the flow rate $f_3$ of air through the second port 63d of the third valve unit 63, the switch actuating plunger 46 is now moved toward its foremost axial position or the full engagement point FEP at a velocity which is higher than the velocity of the plunger movment dictated by the flow rate $f_4$ but which is lower than the velocity of the plunger movement dictated by the flow rate $f_3$, as will be seen from line E-G of the plot shown in FIG. 4A. The timing at which the movable-contact switch 55' is made open varies with the positional relationship between the movable contact carrier 53 and the switch actuating plunger 46 of the servo motor 33, viz., with the distance of displacement of the accelerator pedal 30 depressed. The range of the plunger movement dictated by the flow rate $f_5$ of air through the third port 64e of the fourth valve unit 64 varies as indicated by the hatched area between the line E-G and line E'-G', wherein the point E' is determined by a maximum distance $d_3$ through which the movable contact elements 55 are allowed to move from the positions dictated by the accelerator pedal 30 in the released condition.

When the control chamber 42 of the servo motor 33 is expanded into the maximum-volume condition having the switch actuating plunger 46 in the foremost axial position or at the full engagement point EEP, the clutch assembly 20 is fully coupled and transmits torque therethrough substantially at a 100 percent efficiency. The vehicle is driven directly by the engine.

From the foregoing description it will be understood that the clutch control apparatus hereinbefore described is adapted to couple the clutch assembly 20 from the fully uncoupled condition progressively in four different phases when the vehicle is to be started from a halt. In the first phase, the servo motor 33 depends for its operation on the flow of air passed through the second port 62d of the second valve unit 62 and the clutch assembly 20 is driven toward the initially coupled condition at a velocity proportional to the flow rate $f_2$ of air through the port 62d, as indicated by the line C-D of the plot shown in FIG. 4A. In the second phase, the servo motor 33 is operated by the flow of air which is passed through the second port 63d of the third valve unit 63 so that the clutch assembly 20 in a partial torque transmission condition is driven toward the fully coupled condition at a velocity proportional to the flow rate $f_3$ of air through the port 63d, viz., more slowly than in the first phase, as indicated by the line D-E or D-E-E' of the plot of FIG. 4A. If, in this instance, the position of the accelerator pedal 30 is such that the opening degree of the carburetor throttle valve is smaller than approximately one eighth of the fully opening degree of the throttle valve when the clutch assembly 20 is being driven in the second phase, the second phase is followed by a third phase in which the servo motor 33 is operated by the flow of air through the second port 64d of the fourth valve unit 64 so that the clutch assembly 20 is driven toward the fully coupled condition at a velocity proportional to the flow rate $f_4$ of air passed through the port 64d, viz., more slowly than in the second phase, as indicated by the hatched area between the lines E-F and D-F' in the plot of FIG. 4A. If, however, the position of the accelerator pedal 30 is depressed to such an extent as will produce a throttle valve opening degree greater than approximately one eighth of the fully opening degree of the throttle valve by the time at which the switch actuating plunger 46 of the servo motor 33 is moved into a position causing the movable-contact switch 55' to open, the second phase of operation is followed by a fourth phase in which the servo motor 33 depends for its operation on the flow of air passed through the third port 64e of the fourth valve unit 64 so that the clutch assembly 20 in the partial torque transmission condition is driven towards the fully coupled condition at a velocity proportional to the flow rate $f_5$ of air through the port 64e, viz., more slowly than in the second phase but more rapidly than in the third phase, as indicated by the hatched area between the lines E-G and E'-G' of the plot shown in FIG. 4A. If the accelerator pedal 30 is maintained in the released position when the clutch assembly 20 is initially engaged, the first phase is followed directly by the third phase as indicated by the line D-F' in FIG. 4A. If, furthermore, the accelerator pedal 30 is depressed to a depth providing a throttle valve opening degree greater than approximately one eighth of the fully opening degree of the throttle valve during the third phase, then the third phase is followed by the fourth phase so that the clutch assembly 20 is driven toward the fully coupled condition more rapidly than during the third phase, though not indicated by the plot of FIG. 4A.

When the clutch assembly 20 is thus fully coupled and the vehicle speed becomes higher than a predetermined level which is herein assumed to be approximately 15 kilometers per hour, the vehicle-speed switch 84 becomes open so that the normally-open and normally-closed first and second contact sets 86b and 86c, respectively, of the second relay 86 are allowed into their respective normal states. If the transmission gear shift lever 31 is operated under these conditions, the shift-on switch 79 is closed and energizes the exciting coil 61i of the first valve unit 61 from the d.c. power source 77 so that the first valve unit 61 is conditioned to provide communication between the vacuum passageway 66 and the control chamber 42 of the servo motor 33, which consequently is actuated into the condition causing the clutch assembly 20 to be uncoupled, as indicated by the line A-B of the plot shown in FIG. 4B. If, in this instance, the transmission gear shift lever 31 is moved into the second forward-drive gear position and is then released from the manipulative effort which has been applied thereto, the shift-on switch 79 is made open for a second time so that the exciting coil 61i of the first valve unit 61 is de-energized. The clutch assembly 20 is therefore driven in the previously described first phase toward the engaged condition, as indicted by the line C-D in the plot of FIG. 4B. If the accelerator pedal 30 is depressed and accordingly the idling-on switch 83 is made open at or by the instant when the clutch assembly 20 reaches the initially coupled condition as indicated at point D in the plot of FIG. 4B, the normally-open and normally-closed first and second contact sets 85b and 85c of the first relay 85 are made open and closed, respectively. The respective normally-closed second contact sets 85c and 86c of the first and second relays 85 and 86 being thus closed with the idling-on switch 83 and the vehicle-speed switch 84 closed, the previously described condition (6) is established, providing connection between the line 74 and the positive d.c. bus line 78 through these contact sets 85c and 86c and the diode 91. Under these conditions, the exciting coil 63i of the third valve unit 63 is energized from the d.c. power source 77 so that the servo motor 33 is operated by the flow of air which is passed through the second port 63d of the third valve unit 63. The clutch assembly 20 is therefore operated in the previously mentioned second phase and is driven in the partial torque transmission range at a velocity which is proportional to the flow rate $f_3$ of air through the port 63d of the third valve unit 63 as indicated by line D-H of the plot shown in FIG. 4B, the line having a gradient which is identical with the gradient of the line D-E of the plot shown in FIG. 4A. If, however, the accelerator pedal 30 is kept released and the idling-on switch 83 is held closed at the instant when the clutch assembly 20 is initially engaged, the exciting coils 61i to 64i of the first to fourth valve units 61 to 64 are all kept de-energized so that each of the valve units 61 to 64 is held in the condition providing communication between the respective first and third ports thereof as shown in FIG. 1. The servo motor 33 is consequently operated by the flow of air which is passed through the third port 64e of the fourth valve unit 64 with the result that the clutch assembly 20 is operated in the previously mentioned fourth phase toward the fully coupled condition as indicated by line D-H' of the plot shown in FIG. 4B, the line D-H' having a gradient which is equal to the gradient of the line E-G or E'-G' of the plot shown in FIG. 4A. The clutch assembly 20 is thus driven in the partial torque transmission condition at a velocity which is higher under the condition in which the accelerator pedal 30 is depressed than under the condition in which the accelerator pedal 30 is kept released when the clutch assembly 20 is in the partial torque transmission condition after shift is made from the first forward-drive gear position into the second forward-drive gear position.

When the transmission gear shift lever 31 is then moved from the second forward gear position into the third forward-drive gear position or past this position into the fourth forward-drive gear position, the gearposition switch 82 which has been kept open is closed and causes the normally-open contact sets 87b and 87c of the third relay 87 to close, thereby producing the previously described condition (7). Connection is now provided between the line 74 and the positive d.c. bus line 78 through the respective second contact sets 86c and 87c of the second and third relays 86 and 87 and the diode 91. When the transmission gear shift lever 31 is then released, therefore, the clutch assembly 20 is operated in the first phase and thereafter in the second phase toward the fully coupled condition by the servo motor 33 which is operated firstly by the flow of air passed through the second port 62d of the second valve unit 62 at the rate $f_2$ (as indicated by the line C-D in FIG. 4B) and thereafter by the flow of air passed through the second port 63d of the third valve unit 63 at the rate $f_3$ (as indicated by the line D-H in FIG. 4B).

If shiftdown is made from the third forward-drive gear position into the second forward-drive gear position, the gearposition switch 82 and accordingly the normally-open first and second contact sets 87b and 87c of the third relay 87 are made open. If, in this instance, the accelerator pedal 30 is kept released and the idling-on switch 83 is closed, not only the second contact set 87c of the third relay 87 but the second contact set 85c of the first relay 85 is open. The exciting coils 61i to 64i of the first to fourth valve units 61 to 64 are therefore all deenergized so that the clutch assembly 20 is coupled through the first and fourth phases following the characteristics indicated by the lines C-D and D-H' of the plot shown in FIG. 4B. If, however, the accelerator pedal 30 is depressed and the idling-on switch 83 is open, the second contact set 85c of the first relay 85 is closed so that the clutch assembly 20 is coupled through the first and second phases following the characteristics indicated by the lines C-D and D-H of the plot shown in FIG. 4B.

Figures 5, 6:
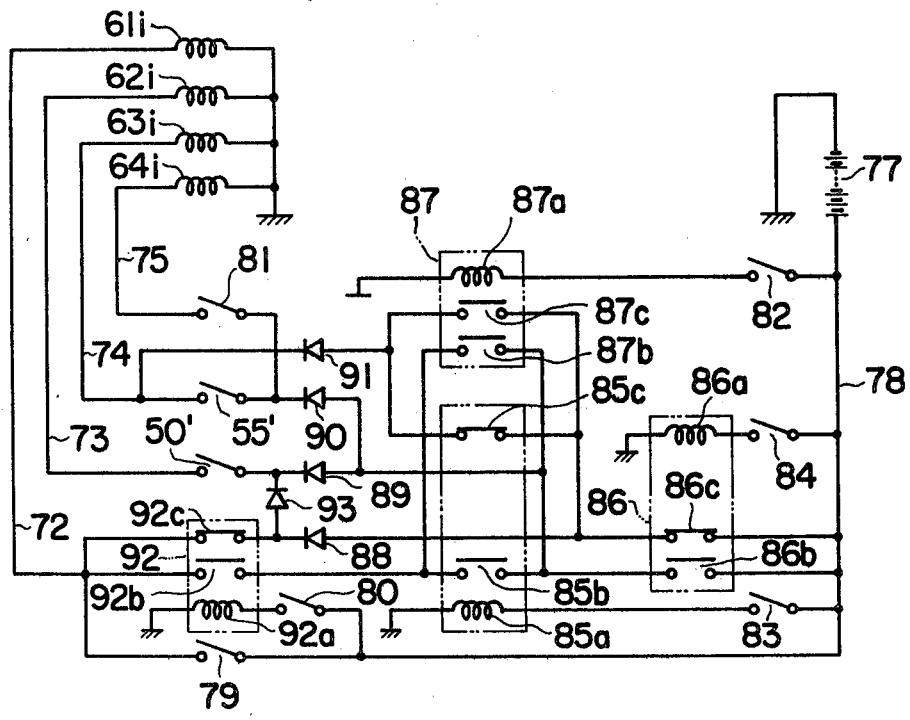
FIG. 5 is a view showing a modification of the circuit arrangement illustrated in FIG. 3.
FIG. 6 is a table showing the performance characteristics achievable in the embodiment of FIG. 1 by means of the circuit arrangement of FIG. 5.

When the transmission gear shift lever 31 is in the neutral position and is released from a manipulative effort, both the shift-on switch 79 and the neutral-off switch 80 are open so that the exciting coil 61i of the first valve unit 61 is deenergized and accordingly the clutch assembly 20 is maintained in the coupled condition as previously discussed. When shift is made from the neutral position into another gear position, the shift-on switch 79 is closed to temporarily uncouple the clutch assembly 20 during shifting. For the purpose of providing ease in manipulating the transmission gear shift lever 31, it will therefore be advantageous if arrangement is made so that the clutch assembly 20 is kept uncoupled when the shift lever 31 is in the neutral position. If, however, such arrangement is made unconditionally, the release mechanism of the clutch assembly 20 would be kept loaded when the transmission system is held in the neutral condition and would cause deterioration of the durability of the mechanism, particularly the bearing incorporated in the mechanism. FIG. 5 illustrates a control circuit which is arranged to eliminate such a problem by maintaining the clutch assembly in the uncoupled condition when the transmission gear shift lever is in the neutral position and the vehicle is being driven at a relatively low speed such as for example about 10 killometers per hour.

The control circuit shown in FIG. 5 is a modification of the control circuit illustrated in FIG. 3 and includes all the comnonents of the latter, such components being designated by like reference numerals and subscripts. In the control circuit shown in FIG. 5, however, the vehicle-speed switch 84 is assumed to be closed in response to a vehicle speed lower than approximately 10 killometers per hour and open in response to a higher vehicle speed. In addition to the components illustrated in FIG. 3, the control circuit of FIG. 5 comprises a fourth relay 92 consisting of a coil 92a, a normally-open first contact set 92b and a normally-closed second contact set 92c. The coil 92a is grounded at one end and connected at the other to the positive d.c. bus line 78 across the neutral-off switch 80. The first contact set 92b is connected between the line 72 and the positive d.c. bus line 78 across the series combination of the respective first contact sets 85b and 86b of the first and second relays 85 and 86. The second contact set 92c of the fourth relay 88 is connected between the line 72 and the positive d.c. bus line 78 through the diode 88. A diode 93 has its anode electrode connected to a node between the diode 88 and the second contact set 92c of the fourth relay 92 and its cathode electrode connected to a node between the diode 89 and the stationary-contact switch 50' so that the current passed through the diode 89 is prevented from being passed to the second contact set 92c of the fourth relay 92. The exciting coil 61i of the first valve unit 61 (FIG. 1) is thus energized from the d.c. power source 77 not only when (1) the shift-on switch 79 is closed with the transmission gear shift lever 31 (FIG. 1) being manipulated, (2) the neutral-off switch 80, the idling-on switch 83 and the vehicle-speed switch 84 are closed concurrently with the transmission gear shift lever in an off-neutral position and with the accelerator pedal 30 (FIG. 1) kept released while the vehicle is running at a speed lower than approximately 10 kilometers per hour or (3) the neutral-off switch 80 and the vehiclespeed switch 84 are closed as in the condition (2) and, simultabeously, the gear-position switch 82 is closed with the transmission gear shift lever in the third or fourth forward-drive gear position but when (9) the neutral-off switch 80 and the vehicle-speed switch 84 are open with the transmission gear shift lever in the neutral position while the vehicle is being driven at a speed higher than approximately 10 killometers per hour. When, thus, the transmission gear shift lever 31 is moved into the neutral position while the vehicle is running at a speed lower than approximately 10 killometers per hour, the exciting coil 61i of the first valve unit 61 is kept de-energized and accordingly the clutch assembly 20 is maintained in the coupled condition unless the shift-on switch 79 is closed in response to a manipulative effort applied to the transmission gear shift lever 31. When the transmission gear shift lever 31 is in the neutral position while the vehicle is being driven at a speed higher than the above mentioned level, the vehicle-speed switch 84 is open to allow the normally-closed second contact set 86c of the second relay 86 to close so that the exciting coil 61i of the first valve unit 61 is energized from the d.c. power source 77 through the contact set 86c of the second relay 86 and the normally-closed second contact set 92c of the fourth relay 92 with the neutral-off switch 80 kept open as shown in FIG. 5. The clutch assembly 20 is thus held uncoupled if the transmission gear shift lever is in the neutral condition when the vehicle is running at a speed higher than approximately 10 killometers per hour, as will be seen from the table of FIG. 6.

Figure 7:
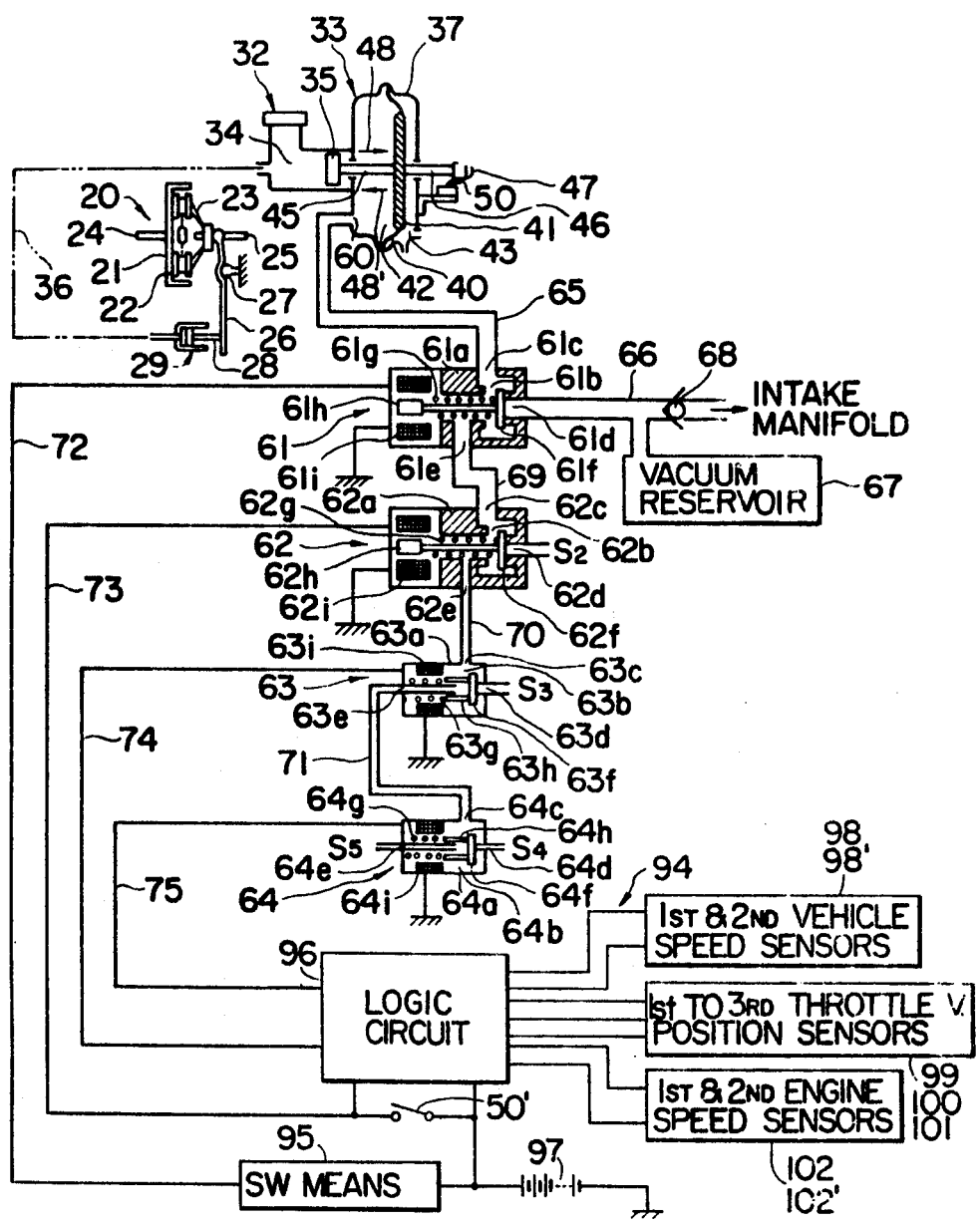
FIG. 7 is a view similar to FIG. 1 but shows another preferred embodiment of a clutch control apparatus according to the present invention.

FIG. 7 illustrates another preferred embodiment of the present invention. In the embodiment shown in FIG. 7, the first to fourth valve units 61 to 64 per se are constructed and arranged similarly to their counterparts in the embodiment of FIG. 1. The servo motor 33 is also similar to its counterpart of the embodiment of FIG. 1 but is void of the movable contacts 55 and the associated members. The embodiment of FIG. 6 is thus characterized by a control circuit 94 for controlling the first to fourth valve units 61 to 64. The control circuit 94 comprises switch means 95 to control the first valve unit 61 and a logic circuit 96 to control the third and fourth valve units 63 and 64. The second valve unit 62 is operated under the control of the stationary-contact switch 50' which is constituted by the stationary contact elements 50 mounted on the servo motor 33 as in the embodiment of FIG. 1.

The switch means 95 are responsive to a manipulative effort applied to the transmission gear shift lever (not shown), the neutral position of the transmission gear shift lever and an idling condition of the engine and is adapted to open when the transmission gear shift lever is in the neutral position and to close in response to idling condition of the engine or when the transmission gear shift lever is being manipulated to shift gear positions. The switch means 95 may therefore be composed of a combination of the shift-on switch 79, neutral-off switch 80 and idling-on switch 83 described with reference to FIGS. 1 and 3. The switch means 95 is connected between a d.c. power source 97 and the line 72 leading to the exciting coil 61i of the first valve unit 61. The stationary-contact switch 50' is connected between the power source 97 and the line 73 leading to the exciting coil 62i of the second valve unit 62.

The logic circuit 96 is connected to the lines 74 and 75 leading to the exciting coils 63i and 64i of the third and fourth valve units 63 and 64, respectively, and are operated on the basis of logic signals which are delivered from first and second vehicle speed sensors 98 and 98', first, second and third throttle-valve position sensors 99, 100 and 101, and first and second engine speed sensors 102 and 102'. The first vehicle speed sensor 98 is arranged to produce a logic "1" output signal in response to a vehicle speed lower than a predtermined first level and a logic "0" output signal in response to a vehicle speed higher than the particular level. The second vehicle speed sensor 98' is arranged to produce a logic "1" output signal in response to a vehicle speed lower than a predetermined second level lower than the above mentioned first level and a logic "0" output signal in response to a vehicle speed higher than the second level. The first and second levels of the vehicle speed are herein assumed by way of example to be approximately 15 and 7 killometers per hour, respectively. The first, second and third throttle-valve position sensors 99, 100 and 101 are adapted to produce logic "1" output signals when the opening degree of the carburetor throttle valve is greater than predetermined first, second and third values, respectively, which are greater in this sequence. The first, second and third values are herein assumed by way of example to be one eighth, three eighths and six eighths, respectively, of the fully opening degree of the carburetor throttle valve. When the opening degree of the throttle valve is smaller than one eighth of the fully opening degree, all the first, second and third throttle-valve position sensors 99, 100 and 101 produce logic "0" output signals. When the throttle valve opening degree is smaller than three eighths but larger than one eighth of the fully opening degree, the first throttlevalve position sensor 99 produces the logic "1" output signal and the second and third throttle-valve position sensors 100 and 101 product logic "0" output signals. When the throttle valve opening degree is smaller than six eighths but larger than three eighths of the fully opening degree, the first and second throttlevalve position sensors 99 and 100 produce the logic "1" output signals and the third throttle-valve position sensor 101 produces a logic "0" output signal. When the throttle valve opening degree is larger than six eighths of the fully opening degree, then all the throttle-position sensors 99, 100 and 101 produce the logic "1" output signals. The first engine speed sensor 102 is arranged to produce a logic "1" output signal in response to an engine output speed lower than a predetermined first level and a logic "0" output signal in response to an engine output speed higher than the particular level. The second engine speed sensor 102' is adapted to produce a logic "1" output signal in response to an engine output speed lower than a predetermined second level lower than the above mentioned first level and a logic "0" output signal in response to an engine output speed higher than the second level. The first and second levels of the engine output speed are herein assumed by way of example to be approximately 2400 rpm and 1600 rpm, respectively. If, thus, the output speed of the engine is lower than 1500 rpm, both the first and second engine speed sensors 102 and 102' produce the logic "1" output signals and, if the engine output speed is higher than 2400 rpm, both the first and second engine speed sensors 102 and 102' produce the logic "0" output signals. If the output speed of the engine is higher than 1600 rpm and lower than 2400 rpm, then the first engine speed sensor 102 produces the logic "1" output signal and the second engine speed sensor 102' produces the logic "0" output signal.

Figure 8:
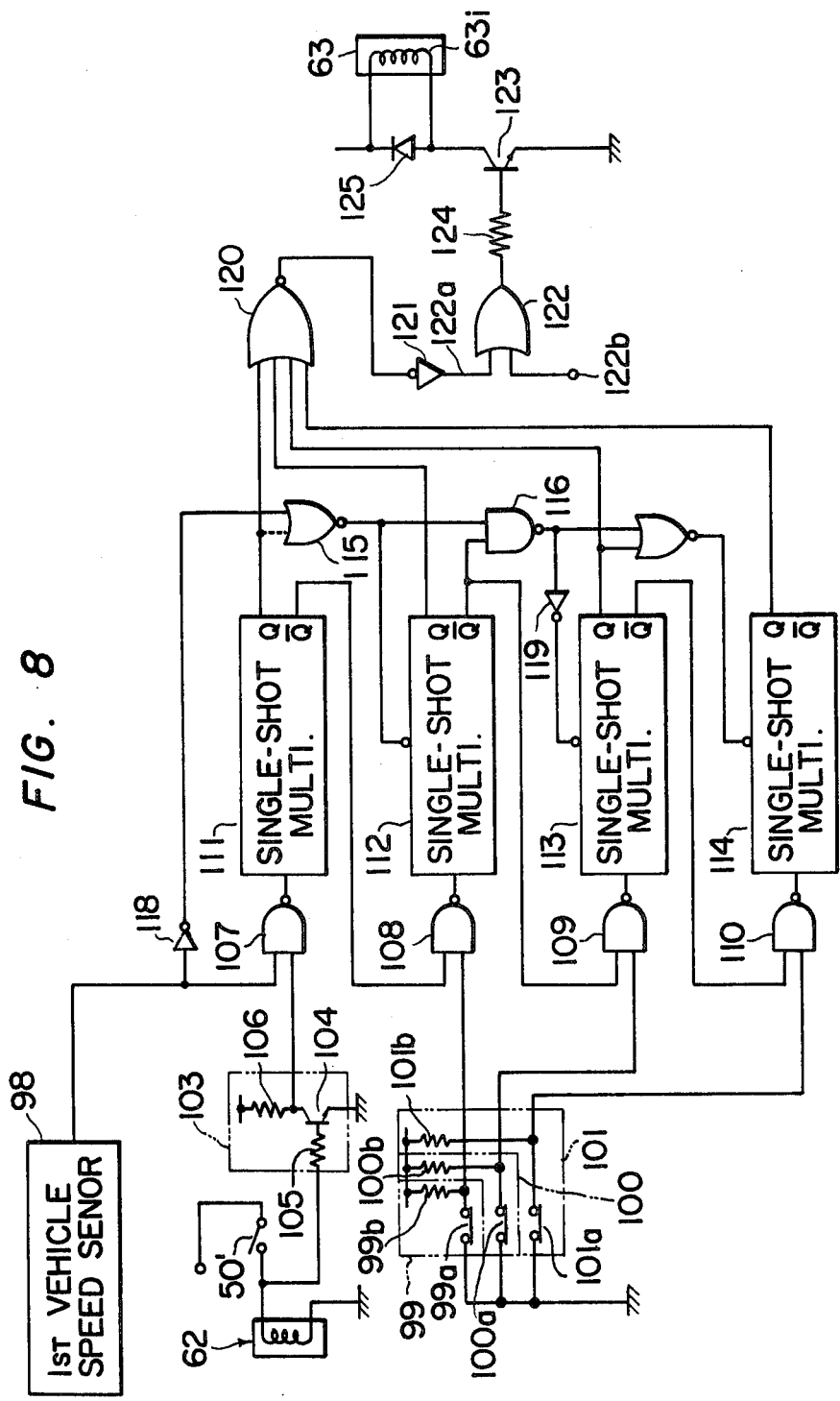

In FIG. 8, the above mentioned first, second and third throttle-valve position sensors 99, 100 and 101 are shown to comprise normally-closed contact sets 99a, 100a and 101a, respectively, which are connected in parallel with each other between ground and the positive terminal of the d.c. power source 97 (FIG. 6) through resistors 99b, 100b and 101b, respectively. The normally-open first, second and third contact sets 99a, 100a and 101a are arranged to be closed in response to throttle valve opening degrees smaller than one eighth, three eighths and six eighths, respectively, of the fully opening degree.

Referring further to FIG. 8, there is provided a transistor inverter 103 which consists of a transistor 104 having a base connected through a resistor 105 and across the stationary-contact switch 50' to the positive terminal of the d.c. power source. The transistor 104 has its emitter grounded and its collector connected through a resistor 106 to the d.c. power source.

The circuit arrangement shown in FIG. 8 further comprises first, second, third and fourth logic "NAND" gate circuits 107, 108, 109 and 110 each having two input terminals and first, second, third and fourth single-shot multivibrators 111, 112, 113 and 114 each having first and second output terminals Q and Q' at which logic "1" and "0" output signals of the multivibrator are to appear alternately. If each of the multivibrators 111 to 114 is constructed of a bridge network using two transistors, the terminals Q and Q' of each multivibrator may be respectively constituted by the collectors of the transistors so that when a logic "1" output signal appears at one of the output terminals Q and Q' then a logic "0" signal appears at the other thereof. The first "NAND" gate circuit 107 has a first input terminal connected to the output terminal of the previously mentioned first vehicle speed sensor 98 and a second input terminal connected to the collector of the transistor 104 of the interver circuit 103. The first "NAND" gate circuit 107 is operative to produce a logic "1" signal at its output terminal except when the vehicle speed detected by the first vehicle speed sensor 98 is lower than 15 killometers per hour and, in addition, the stationary-contact switch 50' is open to make the transistor 104 conducting. The output terminal of the first "NAND" gate circuit 107 is connected to a trigger terminal of the first single-shot multivibrator 111. The second logic "NAND" gate circuit 108 has a first input terminal connected to the second output terminal Q' of the first single-shot multivibrator 111 and a second input terminal connected to a node between the contact set 99a and resistor 99b constituting the first throttle-valve position sensor 99. The second "NAND" gate circuit 108 is thus operative to produce a logic "1" signal at its output terminal except when a logic "1" signal is appearing at the second output terminal Q' of the first single-shot multivibrator 111 and, in addition, the contact set 99a of the first throttle-valve position sensor 99 is open so that a logic "1" signal is appearing at the second input terminal of the "NAND" gate circuit 108. The output terminal of the second "NAND" gate circuit 108 is connected to a trigger terminal of the second single-shot multivibrator 112. The third logic "NAND" gate circuit 109 has a first input terminal connected to the second output terminal Q' of the second single-shot multivibrator 112 and a second input terminal connected to a node between the contact set 100a and resistor 100b constituting the second throttlevalve position sensor 100. The third "NAND" gate circuit 109 is thus operative to produce a logic "1" signal at its output terminal except when a logic "1" signal is appearing at the second output terminal Q' of the second single-shot multivibrator 112 and, in addition, the contact set 100a of the second throttlevalve position sensor 100 is open so that a logic "1" signal is appearing at the second input terminal of the "NAND" gate circuit 109. The output terminal of the third "NAND" gate circuit 109 is connected to a trigger terminal of the third single-shot multivibrator 113. The fourth logic "NAND" gate circuit 110 has a first input terminal connected to the second output terminal Q' of the third single-shot multivibrator 113 and a second input terminal connected to a node netween the contact set 101a and resistor 101b of the third throttle-valve position sensor 101. The fourth "NAND" gate circuit 110 is thus operative to produce a logic "1" signal at its output terminal except when a logic "1" signal is appearing at the second output terminal Q' of the third single-shot multivibrator 113 and, in addition, the contact set 101a of the third throttle-valve position sensor 101 is closed so that a logic "1" signal is appearing at the second input terminal of the "NAND" gate circuit 110. The output terminal of the fourth "NAND" gate circuit 110 is connected to a trigger terminal of the fourth single-shot multivibrator 114. The second, third and fourth single-shot multivibrators 112, 113, and 114 have clear terminals 112a, 113a and 114a respectively. When a logic "0" signal is being impressed on each of these clear terminals 112a, 113a and 114a, each of the single-shot multivibrators 112, 113 and 114 is locked in an inoperative condition so that logic "0" signals appear at both of its first and second output terminals Q and Q'.

The circuit arrangement of FIG. 8 further comprises a series combination of a first logic "NOR" gate circuit 115, a fifth logic "NAND" gate circuit 116 and a second logic "NOR" gate circuit 117, each of the circuits 115, 116 and 117 having two input terminals. The first logic "NOR" gate circuit 115 has a first input terminal connected via a logic "NOT" gate circuit 118 to the output terminal of the first vehicle-speed sensor 98 and a second input terminal connected to the first output terminal Q of the first single-shot multivibrator 111. The first "NOR" gate circuit 115 is thus operative to produce a logic "0" signal at its output terminal except when logic "0" signals are impressed on both of its first and second input terminals. The output terminal of the first "NOR" gate circuit 115 is connected on one hand to the clear terminal 112a of the second single-shot multivibrator 112 and on the other hand to a first input terminal of the fifth "NAND" gate circuit 116 which has a second input terminal connected to the second output terminal Q' of the second single-shot multivibrator 112. The fifth "NAND" gate circuit 116 is thus operative to produce a logic "1" signal at its output terminal except when the first "NOR" circuit 115 is in a condition delivering a logic "1" output signal and concurrently the second single-shot multivibrator 112 is in a condition delivering a logic "1" signal at its second output terminal Q'. The output terminal of the fifth "NAND" gate circuit 116 is connected on one hand to the clear terminal 113a of the third single-shot multivibrator 113 through a logic "NOT" gate circuit 119 and on the other hand to a first input terminal of the second "NOR" gate circuit 117 which has a second input terminal connected to the first output terminal Q of the third single-shot multivibrator 113. The second "NOR" gate circuit 117 is thus operative to produce a logic "0" signal at its output terminal except when the fifth "NAND" gate circuit 116 is in a condition delivering a logic "0" signal and concurrently the third single-shot multivibrator 113 is in a condition producing a logic "0" signal at its first output terminal Q. The respective first output terminals Q of the first, second, third and fourth single-shot multivibrators 111, 112, 113 and 114 are connected to first, second, third and fourth input terminals of a third logic "NOR" gate circuit 120. The third "NOR" gate circuit 120 is thus operative to deliver a logic "0" output signal when a logic "1" signal is impressed on at least one of the four input terminals thereof. The output terminal of the third "NOR" gate circuit 120 is connected through a logic "NOT" gate circuit 121 to a first input terminal 122a of a logic "OR" gate circuit 122 having a second input terminal 122b. The "OR" gate circuit 122 is adapted to produce a logic "1" output signal with a logic "1" signal impressed on at least one of its first and second input terminals 122a and 122b and is thus operative produce the logic "1" signal at its output terminal when the third "NOR" gate circuit 120 is in a condition delivering the logic "0" output signal to the subsequent "NOT" gate circuit 121. The output terminal of the "OR" gate circuit 122 is connected to the exciting coil 63i of the third valve unit 63 through a transistor amplifier consisting of a transistor 123 having a base connected through a resistor 124 to the output terminal of the "OR" gate circuit 122, an emitter grounded, and a collector connected across the exciting coil 63i through a diode 125, as shown.

Turning to FIG. 9, the control circuit 96 of the embodiment illustrated in FIG. 7 further comprises a logic "OR" circuit 126 having first and second input terminals which are connected to a node between the contact set 100a and resistor 100b of the second throttle-valve sensor 100 and a a node between the contact set 101a and resistor 101b of the third throttle-valve position sensor and 101, respectively. The "OR" gate circuit 126 is thus operative to produce a logic "1" signal at its output terminal when at least one of the contact sets 100a and 101a of the second and third throttle-valve position sensors 100 and 101 is open so that a logic "1" signal is impressed on at least one of the first and second input terminals of the "OR" gate circuit 126. The output terminal of the "OR" gate circuit 126 thus arranged is connected to a sixth logic "NAND" gate circuit 127 having three input terminals. The sixth "NAND" gate circuit 127 has a first input terminal connected to the output terminal of the previously mentioned first vehicle speed sensor 98, a second input terminal connected to the output terminal of the above mentioned "OR" gate circuit 126 and a third input terminal connected to the output terminal of the previously mentioned first engine speed sensor 102 through a logic "NOT" gate circuit 128. The sixth "NAND" gate circuit 127 is thus operative to produce a logic "1" signal at its output terminal except when logic "1" signals are appearing concurrently at the first, second and third input terminals thereof, viz., except when the vehicle speed is lower than 15 killometers per hour with the carburetor throttle valve open with a degree greater than three eighths of the fully opening degree and at the same time the engine output speed is higher than 2400 rpm producing the logic "0" signal at the output terminal of the first engine speed sensor 102. The output terminal of the sixths "NAND" gate circuit 127 is connected to a trigger terminal of a single-shot multivibrator 129 having a single output terminal connected to the second input terminal of the previously described "OR" gate circuit 122 connected through the transistor 123 to the exciting coil 63i of the third valve unit 63. The circuit arrangements shown in FIGS. 8 and 9 are thus adapted to control the third valve unit 63 of the embodiment illustrated in FIG. 7.

Turning to FIG. 10, the logic circuit 96 of the embodiment of FIG. 7 further comprises a seventh logic "NAND" gate circuit 130 having a first input terminal connected to the output terminal of the previously mentioned second vehicle speed sensor 98' and a second input terminal connected through a logic "NOT" gate circuit 131 to the node between the contact set 100a and resistor 100b of the second throttle-valve position sensor 100. The seventh "NAND" gate circuit 130 is thus operative to produce a logic "1" output signal except when the vehicle speed detected by the second vehicle speed sensor 98' is lower than 7 killometers per hour and, in addition, the contact set 100a of the second throttlevalve sensor 99 is closed in response to a throttle valve opening degree smaller than three eighths of the fully opening degree. The circuit arrangement of FIG. 10 further comprises a logic "OR" gate circuit 132 having a first input terminal connected through a logic "NOT" gate circuit 133 to ground across the stationary-contact switch 50' and a second input terminal connected to the output terminal of the previously mentioned second engine speed sensor 102'. The "OR" gate circuit 132 is thus operative to produce a logic "1" signal at its output terminal except when the stationary-contact switch 50' is open to produce a logic "0" signal at the first input terminal of the "OR" gate circuit 132 and simultaneously the engine output speed detected by the second engine speed sensor 102' is higher than 1600 rpm producing the logic "0" signal at the second input terminal of the "OR" gate circuit 132. The output terminal of the "OR" gate circuit 132 is connected to a trigger terminal of a single-shot multivibrator 134 having a single output terminal connected to a logic "NOR" gate circuit 135. The "NOR" gate circuit 135 has a first input terminal connected to the output terminal of the above described "NAND" gate circuit 130 and a second input terminal connected to the output terminal of the single-shot multivibrator 134. The "NOR" gate circuit 135 is thus operative to produce a logic "0" signal at its output terminal except when the "NAND" gate circuit 130 is in a condition producing a logic "0" output signal and, in addition, the single-shot multivibrator 134 is in a condition producing a logic "0" output signal. The output terminal of the "NOR" gate circuit 135 is connected to the coil 64i of the fourth valve unit 64 (FIG. 7) through a transistor amplifier which consists of a transistor 136 having a base connected to the output terminal of the "NOR" gate circuit 135 through a resistor 137, an emitter grounded and a collector connected across the exciting coil 64i through a diode 138 as shown.

The operation of the embodiment of FIG. 7 will be hereinafter described with concurrent reference to FIGS. 7 to 10 and further to FIGS. 11A and 11B which illustrate the movements of the switch actuating plunger 46 of the servo motor 33 shown in FIG. 7 similarly to FIGS. 4A and 4B previously referred to.

When, now, the transmission gear shift lever is held in the neutral position, the switch means 95 (FIG. 7) is open so that the exciting coil 61i of the first valve unit 61 is kept de-energized, blocking the communication between the vacuum passageway 66 and the control chamber 42 of the servo motor 33 as shown. The control chamber 42 is therefore fully expanded to hold the switch actuating plunger 46 in the foremost axial position thereof as indicated by the point A in FIG. 11A and as a consequence the clutch assembly 20 is maintained in the fully coupled condition thereof. When the transmission gear shift lever is then manipulated to effect shifting from the neutral position, the switch means 95 is closed and energizes the exciting coil 61i of the first valve unit 61 from the d.c. power source 97. The vacuum in the vacuum passageway 66 now draws air from the control chamber 42 of the servo motor 33 through the passageway 65 and the first and second ports 61c and 61d and causes the switch actuating plunger 46 to move rearwardly, viz., in the direction of the arrow 48' shown in FIG. 7 until the plunger 46 reaches the full disengagement point FDP as indicated by the line A-B in FIG. 11A. When the accelerator pedal is depressed after the transmission gear shift lever has been moved into the off-neutral position such as a first or second forward-drive gear position, then the switch means 95 becomes open and de-energizes the exciting coil 61i of the first valve unit 61 and establishes communication between the first and third ports 61c and 61e of the valve unit 61. Under these conditions, the contact breaker 47 on the switch actuating plunger 46 remains disengaged from the stationary contact elements 50 on the servo motor 33 so that the exciting coil 62*i* of the second valve unit 62 is energized from the d.c. power source 97 through the stationary-contact switch 50' and provides communication between the first and second ports 62*c* and 62*d* of the second valve unit 62. Atmospheric air is therefore admitted at the rate $f_2$ into the control chamber 42 of the servo motor 33 through the second port 62*d* of the second valve unit 62 as previously described with reference to FIG. 1. The switch actuating plunger 46 is accordingly moved in the direction of the arrow 48 at a velocity proportional to the flow rate $f_2$ as indicated by the line C-D of the plot shown in FIG. 11A. When the switch actuating plunger 46 is brought into engagement with the stationary contact elements 50 on the servo motor 33 and causes the stationary-contact switch 50' to open, the exciting coil 62*i* of the second valve unit 62 is de-energized so that the second port 62*d* of the valve unit 62 is closed and communication is provided between the first and third ports 62*c* and 62*e* of the valve unit 62. The switch actuating plunger 46 is now at the initial engagement point IEP as indicated at the point D of the plot shown in FIG. 11A with the clutch assembly 20 in a partially engaged condition.

The stationary-contact switch 50' being thus open, the first "NAND" gate circuit 107 of the circuit arrangement shown in FIG. 8 is now supplied with a logic "1" signal at its second input terminal and at the same time the "OR" gate circuit 132 of the circuit arrangement shown in FIG. 10 is supplied with a logic "0" signal at its first input terminal connected to the "NOT" gate circuit 133.

During an icipient stage after the vehicle has been started from a halt, the vehicle speed is lower than 7 kilometers per hour so that both of the first and second vehicle speed sensors 98 and 98' are maintained in the conditions producing the logic "1" output signals thereof. Each of the first, sixth and seventh "NAND" gate circuits 107, 128 and 130 of the circuit arrangment shown in FIG. 7, 8 and 9, respectively, is therefore supplied with a logic "1" signal at its respective first input terminal.

The first "NAND" gate circuit 107 of the circuit arrangement shown in FIG. 7 is now in a condition producing a logic "0" signal at its output terminal in the presence of the logic "1" signals impressed on both of its first and second input terminals. The first single-shot multivibrator 111 is triggered by the logic "0" output signal of the "NAND" gate circuit 107 and delivers a pulse $P_1$ having a positive polarity and a predetermined pulsewidth from its first output terminal Q. With a logic "1" signal thus impressed on its first input terminal, the "NOR" circuit 120 subsequent to the first single-shot multivibrator 111 produces a logic "0" output signal, feeding a logic "1" signal to the first input terminal 122*a* of the "OR" gate circuit 122 through the "NOT" gate circuit 121. The "OR" gate circuit 122 is thus actuated to produce a logic "1" signal at its output terminal and energizes the exciting coil 63*i* of the third valve unit 63. The third valve unit 63 is now in a condition providing communication between the first and second ports 63*c* and 63*d* thereof so that atmospheric air is admitted into the control chamber 42 of the servo motor 33 at the rate $f_3$ through the second port 63*d* of the valve unit 63. The switch actuating plunger 46 of the servo motor 33 is therefore moved beyond the initial engagement point IEP at a velocity proportional to the flow rate $f_3$ smaller than the previously mentioned flow rate $f_2$. The plunger 46 is thus moved in the partial torque transmission range as indicated by line line D-D$_1$ of the plot shown in FIG. 11A for a period of time corresponding to the duration of the pulse $P_1$ delivered from the first single-shot multivibrator 111.

The logic "1" signal delivered from the first output terminal Q of the first single-shot multivibrator 111 is also fed to the second input terminal of the first "NOR" gate circuit 115. The "NOR" gate circuit 115 is therefore brought into the condition to deliver a logic "0" output signal to the clear terminal 112*a* of the second single-shot multivibrator 112 and to the first input terminal of the fifth "NAND" gate circuit 116. While the first single-shot multivibrator 111 is producing the logic "1" signal at its first output terminal Q, a logic "0" signal is delivered from the second output terminal Q' of the multivibrator 111 to the first input terminal of the second "NAND" gate circuit 108. The second "NAND" gate circuit 108 is therefore held in a condition producing a logic "1" output signal and, thus, the second single-shot multivibrator 112 is maintained inoperative in the presence of the logic "1" signal impressed on its trigger terminal and the logic "0" signal impressed on its clear terminal 112*a*. The fifth "NAND" gate circuit 116 is therefore supplied with logic "0" signal at both of its first and second input terminals and delivers a logic "1" output signal to the second "NOR" gate circuit 117 which is accordingly held in a condition producing a logic "0" output signal. The logic "1" output signal delivered from the fifth "NAND" gate circuit 116 is inverted by the "NOT" gate circuit 119 into a logic "0" signal, which is fed to the clear terminal 113*a* of the third single-shot multivibrator 113. Under these conditions, the logic "0" signal appearing at the second output terminal Q' of the second single-shot multivibrator 112 is supplied to the first input terminal of the third "NAND" gate circuit 109 which is therefore held in a condition producing a logic "1" output signal. The third single-shot multivibrator 113 is thus maintained in an inoperative condition. The second "NOR" gate circuit 117 being operative to produce a logic "0" output signal as above described, a logic "0" signal is impressed on the clear terminal 114*a* of the fourth single-shot multivibrator 114. Since, furthermore, the fourth "NAND" gate circuit 110 is held in a condition producing a logic "1" output signal in response to the logic "0" signal applied to the first input terminal thereof, the fourth single-shot multivibrator 114 is also maintained in an inoperative condition. The second, third and fourth single-shot multivibrators 112, 113 and 114 are thus all maintained in the inoperative conditions when the first single-shot multivibrator 111 is in a condition delivering the pulse $P_1$ from its first output terminal Q.

Simultaneously when the pulse $P_1$ from the first output terminal Q of the first single-shot multivibrator 111 lapses, the multivibrator 111 is caused to deliver a logic "0" signal from the output terminal Q to the second input terminal of the first "NOR" gate circuit 115 and a logic "1" signal from its second output terminal Q' to the first input terminal of the second "NAND" gate circuit 108. The first "NOR" gate circuit 115 is now supplied with logic "0" signals at both of its first and second input terminals with the logic "1" signal from the first vehicle speed sensor 98 inverted into a logic "0" signal by the "NOT" gate circuit 118 and delivers a logic "1" signal to the first input terminal of the fifth "NAND" gate circuit 116 and to the clear terminal 112*a* of the second single-shot multivibrator 112. The second single-shot multivibrator 112 is now ready to be initiated into action. If, under these conditions, the accelerator pedal is in a position providing a throttle valve opening degree greater than one eighth but smaller than three eighths of the fully opening degree, the contact set 99a of the first throttle-valve position sensor 99 is open and the contact sets 100a and 101a of the second and third throttle-valve position sensors 100 and 101 are cloed so that a logic "1" signal appears at the seond input terminal of the second "NAND" gate circuit 108 with a logic "0" signal appearing at each of the second input terminals of the third and fourth "NAND" gate circuits 109 and 110 in the arrangement of FIG. 8. The second "NAND" gate circuit 108 is now supplied with the logic "1" signals at both of its first and second input terminals and is allowed to deliver a logic "0" output signal to the trigger terminal of the second single-shot multivibrator 112. The multivibrator 112 is driven to produce at its first output terminal Q a pulse $P_2$ having a positive polarity and a predetermined pulsewidth. The logic "1" signal thus delivered from the first output terminal Q of the second single-shot multivibrator 112 is fed to the second input terminal of the third "NOR" gate circuit 120 which is accordingly brought into a condition to produce a logic "0" output signal. The exciting coil 63i of the third valve unit 63 is therefore maintained energized for a period of time corresponding to the duration of the pulse $P_2$ subsequent to the pulse $P_1$ previously delivered from the first output terminal Q of the first single-shot multivibrator 111. The switch actuating plunger 46 of the servo motor 33 shown in FIG. 7 is thus kept moved in the partial torque transmission range as indicated by line $D_1$-E of the plot shown in FIG. 11A.

Figure 11A:
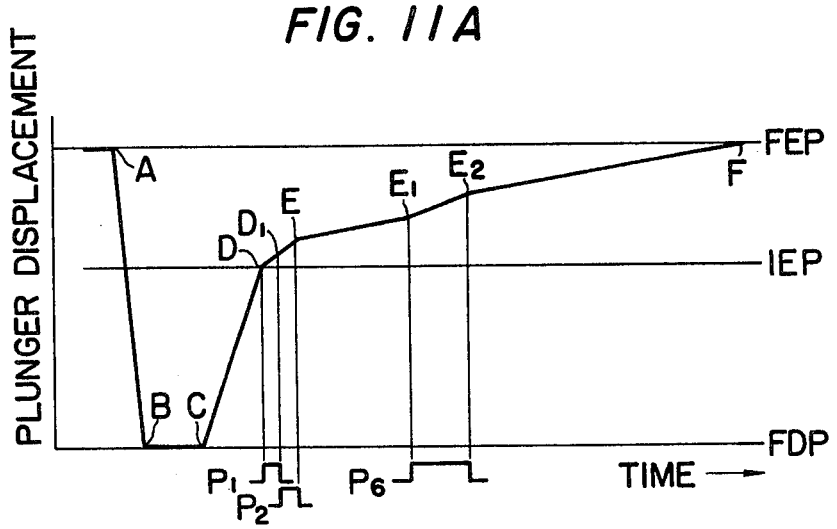
FIGS. 11A and 11B are similar to FIGS. 4A and 4B but illustrate the performance characteristics which are achievable in the embodiment of FIG. 7 by the use of the circuit arrangements of FIGS. 8, 9 and 10.
Figure 11B:
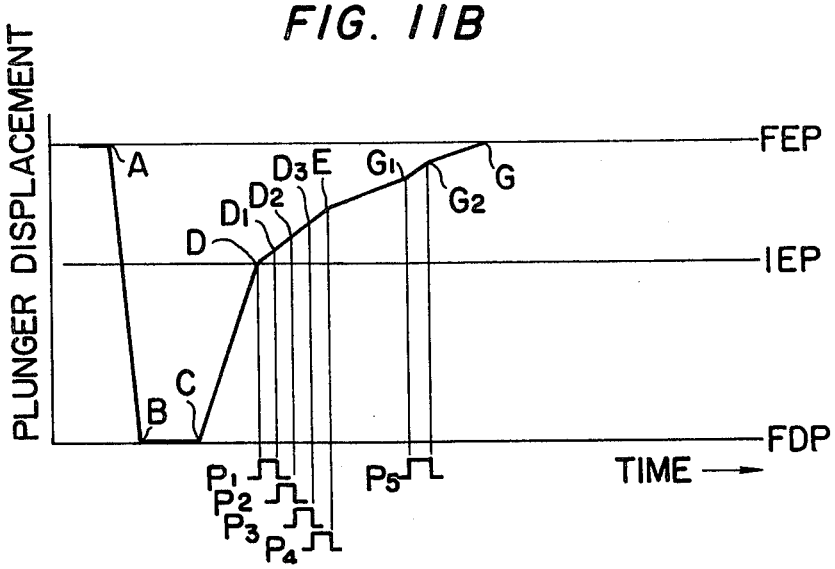

If the accelerator pedal is in a position providing a throttle valve opening desgree smaller than three eighths of the fully opening at the time when the point E of the plot shown in FIG. 11A is reached by the switch actuating plunger 46, the contact sets 100a and 101a of the second and third throttle-valve position sensors 100 and 101 are kept closed and as a consequence the logic "0" signals are maintained at the respective second input terminals of the third and fourth "NAND" gate circuits 109 and 110, which are therefore held in the conditions producing the logic "1" output signals. On the other hand, the logic "0" output signal being delivered from the second output terminal Q of the second single-shot multivibrator 112 maintains the fifth "NAND" gate circuit 116 in the condition producing the logic "1" output signal. The third and fourth single-shot multivibrators 113 and 114 thus remain inoperative. The contact sets 100a and 101a of the second and third contact sets 100 and 101 being kept closed as above mentioned, the "OR" gate circuit 126 of the circuit arrangement shown in FIG. 9 is supplied with logic "0" signals at both of its first and second input terminals and accordingly delivers a logic "0" output signal to the second input terminal of the sixth "NAND" gate circuit 126. The sixth "NAND" gate circuit 128 thus delivers a logic "1" output signal to the trigger terminal of the fifth single-shot multivibrator 129 irrespective of the signal impressed on the first and third input terminals of the "NAND" gate circuit 128. The fifth single-shot multivibrator 129 is therefore held in a condition delivering a logic "0" output signal to the second input terminal 122b of the "OR" gate circuit 122. When the pulse $P_2$ from the second single-shot multivibrator 112 of the circuit arrangement shown in FIG. 8 lapses, logic "0" signals thus appear at both of the first and second input terminals 122a and 122b of the "OR" gate circuit 122 so that the exciting coil 63i of the third valve unit 63 becomes de-energized. The third valve unit 63 is now shifted into the condition closing the second port 63d and providing communication between the first and third ports 63c and 63e thereof. If, in this instance, the output speed of the engine is lower than 1600 rpm and as a consequence the second engine speed sensor 102' is producing a logic "1" output signal, the "OR" gate circuit 132 of the circuit arrangement shown in FIG. 10 is brought into a condition to deliver a logic "1" output signal to the sixth single-shot multivibrator 134 which is therefore caused to produce a logic "0" output signal. The throttle valve opening degree being smaller than three eighths of the fully opening degree of the throttle valve, the contact set 100a of the second throttle-valve position sensor 100 remains closed so that the seventh "NAND" gate circuit 130 is supplied with a logic "1" signal from the "NOT" gate circuit 131. If the vehicle speed is still lower than 7 killometers per hour, the "NAND" gate circuit 130 thus receives logic "1" signals at both of its first and second input terminals and produces a logic "0" output signal. The "NOR" gate circuit 135 is therefore actuated to produce a logic "1" output signal in the presence of the logic "0" signals at both of its first and second input terminals and energizes the exciting coil 64i of the fourth valve unit 64. The fourth valve unit 64 is thus brought into the condition providing communication between the first and second ports 64c and 64d so that atmospheric air is drawn into the control chamber 42 of the servo motor 33 at a rate $f_4$ through the second port 64d of the fourth valve unit 64. The switch actuating plunger 46 of the servo motor 33 is therefore moved at a reduced velocity as indicated by line E-$E_1$ of the plot shown in FIG. 11A.

If the engine output speed is then increased beyond the predetermined level of 1600 rpm, then the "OR" gate circuit 132 of the circuit arrangement shown in FIG. 10 is supplied with a logic "0" signal at its second input terminal and is conditioned to produce a logic "0" output signal in the present of the logic "0" signals at both of its first and second input terminals. The sixth single-shot multivibrator 134 is now triggered to produce a pulse $P_6$ having a positive polarity and a predetermined pulsewidth. The "NOR" gate circuit 135 subsequent to the multivibrator 134 is accordingly conditioned to produce a logic "0" output signal irrespective of the output signal from the seventh "NAND" gate circuit 130, thereby de-energizing the exciting coil 64i of the fourth valve unit 64. The fourth valve unit 64 is now held in a condition closing the second port 64d and providing communication between the first and third ports 64c and 64e thereof for a period of time corresponding to the pulse $P_6$ delivered from the sixth single-shot multivibrator 134. Under these condition, atmospheric air is drawn into the control chamber 42 of the servo motor 33 at a rate $f_5$ through the third port 64e of the fourth valve unit 64 and causes the switch actuating plunger 46 to move toward its full engagement point FEP at an increased velocity as indicated by line $E_1$-$E_2$ of the plot of FIG. 11A. This causes the clutch assembly 20 to be actuated at an increased velocity toward the fully coupled condition temporarily for the period of time corresponding to the duration of the pulse $P_6$ delivered from the sixth single-shot multivibrator 134. If the increase of the engine output speed beyond the predetermined level of 1600 rpm has resulted from the reduction in the friction of the facings of the clutch disc 22, the coupling motion of the clutch assembly 20 is accelerated temporarily and compensates for such reduction in the friction of the clutch facings. If the engine output speed is reduced below the predetermined level of 1600 rpm upon lapse of the pulse $P_6$, the "OR" gate circuit 132 of the circuit arrangement of FIG. 10 is shifted into the condition producing a logic "1" output signal so that the exciting coil 64$i$ of the fourth valve unit 64 is de-energized and accordingly the switch actuating plunger 46 of the servo motor 33 is moved at the velocity proportional to the flow rate $f_4$ of air through the second port 64$d$ of the valve unit 64, as indicated by line $E_2$-F of the plot shown in FIG. 11A.

If the accelerator pedal is in a position providing a throttle valve opening degree greater than three eighths but smaller than six eighths of the fully opening degree of the valve at an instant when the pulse $P_2$ from the second single-shot multivibrator 112 (FIG. 8) lapses, the contact set 100$a$ of the second throttle-valve position sensor 100 is made open so that the sensor 100 delivers a logic "1" output signal to the second terminal of the third "NAND" gate circuit 109 of the circuit arrangement shown in FIG. 8, to the first input terminal of the "OR" gate circuit 126 of the circuit arrangement shown in FIG. 9 and to the "NOT" gate circuit 131 of the circuit arrangement shown in FIG. 10. The seventh "NAND" gate circuit 130 of the arrangement of FIG. 10 is caused to produce a logic "1" output signal irrespective of the output signal of the second vehicle speed sensor 98' and as a consequence the "NOR" gate circuit 135 subsequent to the particular "NAND" gate circuit 130 is caused to produce a logic "0" output signal irrespective of the condition of the sixth single-shot multivibrator 134 whereby the exciting coil 64$i$ of the fourth valve unit 64 is kept energized. At the same time, the "OR" gate circuit 126 of the circuit arrangement shown in FIG. 9 is held in a condition producing a logic "1" output signal in the presence of the logic "1" signal at its first input terminal so that the sixth "NAND" gate circuit 128 subsequent to the particular "OR" circuit 126 is in a condition delivering a logic "1" output signal to the trigger terminal of the fifth single-shot multivibrator 129 irrespective of the signals appearing at the first and third input terminals of the "NAND" gate circuit 128. The fifth single-shot multivibrator 129 is therefore held in a condition producing a logic "0" output signal. In the circuit arrangement shown in FIG. 8, the second single-shot multivibrator 112 produces a logic "1" signal at its second output terminal Q' upon lapse of the pulse $P_2$. If, in this instance, the vehicle speed is still lower than the predetermined level of 15 killometers per hour maintaining the logic "0" signal at the first input terminal of the first "NOR" gate circuit 115, the fifth "NAND" gate circuit 116 is in a condition producing a logic "0" output signal in the presence of the logic "1" signals at both of its first and second input terminals. The logic "0" output signal of the "NAND" gate circuit 116 is inverted by the "NOT" gate circuit 119 into a logic "1" signal, which is fed to the clear terminal 113$a$ of the third single-shot multivibrator 113. Under these conditions, the third "NAND" gate circuit 109 is producing a logic "0" output signal in the presence of the logic "1" signals at both of its first and second input terminals. The third single-shot multivibrator 113 is therefore caused to deliver a pulse $P_3$ having a positive polarity and a predetermined pulsewidth from its first output terminal Q, causing the subsequent "NOR" gate circuit 120 to produce a logic "0" output signal. The "OR" gate circuit 122 is thus operative to produce a logic "1" output signal and energize the exciting coil 63$i$ of the third valve unit 63 for a period of time corresponding to the pulsewidth of the above mentioned pulse $P_3$. The switch actuating plunger 46 is therefore kept moved at a velocity proportional to the flow rate $f_3$ of air through the second port 63$d$ of the valve unit 63 upon lapse of the previously mentioned pulse $P_2$, as indicated by line $D_2$-$D_3$ of the plot shown in FIG. 11B. When the third single-shot multivibrator 113 is in the condition producing the pulse $P_3$ from its first output terminal Q, logic "0" signals are fed to the clear terminal 114$a$ of the fourth single-shot multivibrator 114 and the first input terminal of the fourth "NAND" gate circuit 110 from the second output terminal Q' of the third single-shot multivibrator 113 and the output terminal of the second "NOR" gate circuit 117, respectively. The fourth single-shot multivibrator 114 is thus kept inoperative when the third single-shot multivibrator 113 is in a condition producing the pulse $P_3$. Upon lapse of the pulse $P_3$, logic "1" signals are impressed on the first input terminal of the fourth "NAND" gate circuit 110 and the clear terminal 114$a$ of the fourth single-shot multivibrator 114. If the throttle valve is in a position providing a throttle valve opening degree larger than six eighths of the fully opening degree at an instant when the pulse $P_3$ from the third single-shot multivibrator 113 is disappeared, the fourth "NAND" gate circuit 110 is conditioned to produce a logic "0" output signal in the presence of the logic "1" signal at both of its first and second input terminals. The fourth single-shot multivibrator 114 is now triggered to deliver a pulse $P_4$ having a positive polarity and a predetermined pulsewidth to the fourth input terminal of the subsequent "NOR" gate circuit 120. The exciting coil 63$i$ of the third valve unit 63 is therefore kept energized for a period of time corresponding to the duration of the pulse $P_4$ so that the switch actuating plunger 46 of the servo motor 33 is further moved as indicated by line $D_3$-E of the plot shown in FIG. 11B at a velocity proportional to the flow rate $f_3$ of air through the second port 63$d$ of the third valve unit 63. Upon lapse of the pulse $P_4$, logic "0" signals are present at all of the first to fourth input terminals of the third "NOR" gate circuit 120 of the circuit arrangement shown in FIG. 8 with the result that a logic "0" signal is established at the first input terminal of the "OR" gate circuit 122.

When the contact set 100$a$ of the second throttle-valve position sensor 100 is open with the accelerator pedal held in a position providing a throttle valve opening degree larger than three eighths of the fully opening degree as in the conditions now under consideration, a logic "1" signal is impressed on the first input terminal of the "OR" gate circuit 126 of the circuit arrangement shown in FIG. 9. The "OR" gate circuit 126 is therefore held in a condition producing a logic "1" output signal. Because, in this instance, the vehicle has just been started from a halt, the vehicle speed is lower than the previously mentioned first level of 15 killometers per hour so that a logic "1" signal also appears at the output terminal of the first vehicle speed sensor 98. Logic "1" signals are thus impressed on both of the first and second input terminals of the sixth "NAND" gate circuit 128. If, in this instance, the engine output speed is maintained lower than the previously mentioned first level of 2400 rpm so that the first engine speed sensor 102 is producing a logic "1" output signal, the "NAND" gate circuit 128 is supplied with a logic "0" input signal at its third input terminal connected to the "NOT" gate circuit 127. The "NAND" gate circuit 128 is thus conditioned to deliver a logic "1" output signal to the fifth single-shot multivibrator 129 and maintains the multivibrator 129 in the condition producing a logic "0" output signal. The "OR" gate circuit 122 subsequent to the fifth single-shot multivibrator 129 therefore produces a logic "0" output signal in the presence of the logic "0" signal from the single-shot multivibrator 129 and the logic "0" signal from the "NOT" gate circuit 121 connected to the third "NOR" circuit 120 of the arrangement shown in FIG. 8. The exciting coil 63i of the third valve unit 63 is therefore de-energized and maintains the valve unit 63 in the condition closing the second port 63d and providing communication between the first and third ports 63c and 63e of the valve unit 63, as shown in FIG. 7.

The contact set 100a of the second throttle-valve position sensor 100 being open as above mentioned, the seventh "NAND" gate circuit 130 of the circuit arrangement shown in FIG. 10 is maintained in a condition producing a logic "1" output signal irrespective of the output signal from the second vehicle speed sensor 98' responsive to the previously mentioned second level of 7 killometer-per-hour vehicle speed. The "NOR" gate circuit 135 subsequent to the "NAND" gate circuit 130 is thus conditioned to produce a logic "0" output signal and keeps the exciting coil 64i of the fourth valve unit 64 de-energized. The fourth valve unit 64 is accordingly held in the condition closing the second port 64d and providing communication between the first and third ports 64c and 64e of the valve unit 64. The switch actuating plunger 46 of the servo motor 33 is now moved in the partial torque transmission range as indicated by line E-$G_1$ of the plot shown in FIG. 11B, viz., at an increased velocity which is proportional to the flow rate $f_5$ of air through the third port 64e of the fourth valve unit 64.

If, under these conditions, the output speed of the engine happens to rise beyond the predetermined level of 2400 rpm due, for example, to the reduction in the friction of the facings of the clutch disc 22, the output signal delivered from the first engine speed sensor 102 is changed to a logic "0" signal so that the "NAND" gate circuit 128 of the circuit arrangement of FIG. 9 is supplied with logic "1" signals at all of its input terminals and delivers a logic "0" output signal to the fifth single-shot multivibrator 129. The single-shot multivibrator 129 is triggered and produces a pulse $P_5$ having a positive polarity and a predetermined pulsewidth. The "OR" gate circuit 122 subsequent to the single-shot multivibrator 129 is therefore actuated into a condition producing a logic "1" output signal and maintains the exciting coil 63i of the third valve unit 63 energized for a period of time that corresponds to the duration of the pulse $P_5$. The switch actuating plunger 46 is accordingly moved in the partial torque transmission range as indicated by line $G_1$-$G_2$ of the plot shown in FIG. 11B, viz., temporarily at an increased velocity proportional to the flow rate $f_3$ of air passed through the second port 63d of the third valve unit 63. Upon lapse of the pulse $P_5$, the exciting coil 63i of the third valve unit 63 is de-energized and provides communication between the second and fourth valve units 62 and 64 through the first and third ports 63c and 63e of the third valve unit 63 as shown in FIG. 7. The movement of the switch actuating plunger 46 is for a second time dictated by the flow of air through the third port 64e of the fourth valve unit 64 as indicated by line $G_2$-G of the plot shown in FIG. 11B, with the exciting coil 64i of the valve unit 64 kept de-energized.

Similarly to the embodiment previously described with reference to FIGS. 1 to 3, the embodiment shown in FIGS. 7 to 10 is adapted to pregressively couple the clutch assembly 20 in four different phases. In a first phase, the clutch assembly 20 is driven in an allowance disengagement condition at a velocity proportional to the flow rate $f_2$ air through the second port 62d of the second valve unit 62. The first phase is established when the vehicle is being started with the accelerator pedal depressed and with the transmission gear shift lever held in an off-neutral position. The stationary-contact switch 50' is closed during the first phase and is kept open during second, third and fourth phases. In the second phase, the clutch assembly 20 is driven in a partial torque transmission range at a velocity proportional to the flow rate $f_3$ of air through the second port 63d of the third valve unit 63. The second phase is obtained for a period of time corresponding to the duration of the pulse $P_1$ immediately after the stationary-contact switch 50' is closed if the accelerator pedal is in a position providing a throttle valve opening degree smaller than one eighth of the fully opening degree. If, however, the accelerator pedal is in a position providing a throttle opening degree larger than one eighth but smaller than three eighths of the fully opening degree, the second phase lasts for a period of time corresponding to the sum of the durations of the pulses $P_1$ and $P_2$. If the accelerator pedal is in a position providing a throttle opening degree larger than three eighths but smaller than six eighths of the fully opening degree, the second phase lasts for a period of time corresponding to the sum of the durations of the pulses $P_1$, $P_2$ and $P_3$. If the accelerator pedal is in a position providing a throttle opening degree larger than six eighths of the fully opening degree, then the second phase lasts for a period of time corresponding to the sum of the durations of the pulses $P_1$, $P_2$, $P_3$ and $P_4$. The second phase is also established for a period of time corresponding to the pulse $P_5$ if the engine output speed happens to be increased beyond 2400 rpm when the vehicle is running at a speed lower than 15 killometers per hour with the accelerator pedal maintained in a position providing a throttle opening degree larger than three eighths of the fully opening degree. The third phase of operation of the clutch assembly 22 is achieved for a period of time corresponding to the duration of the pulse $P_6$ if the engine output speed happens to rise beyond 1600 rpm when the vehicle is being driven at a speed lower than 7 killometers per hour with the accelerator pedal held in a position providing a throttle opening degree smaller than three eighths of the fully opening degree. During the third phase, the clutch assembly 20 is driven in the partial torque transmission range at a velocity proportional to the flow rate $f_3$ through the second port 64d of the fourth valve unit 64. The fourth phase of operation of the clutch assembly 20 is obtained if (1) the vehicle speed is higher than 15 killometers per hour with the throttle valve opening degree larger than thee eighths of the fully opening degree or with the engine output speed higher than 1600 rpm, (2) the throttle valve opening degree is smaller than three eighths of the fully opening degree with the vehicle speed lower than 7 killometers per hour or with the engine output speed higher than 1600 rpm, (3) the engine output speed is lower than 2400 rpm with the vehicle speed lower than 7 killometers per hour or with the throttle valve opening degree larger than three eighths of the fully opening degree or (4) the engine output speed is higher than 1600 rpm and lower than 2400 rpm.

Figure 12:
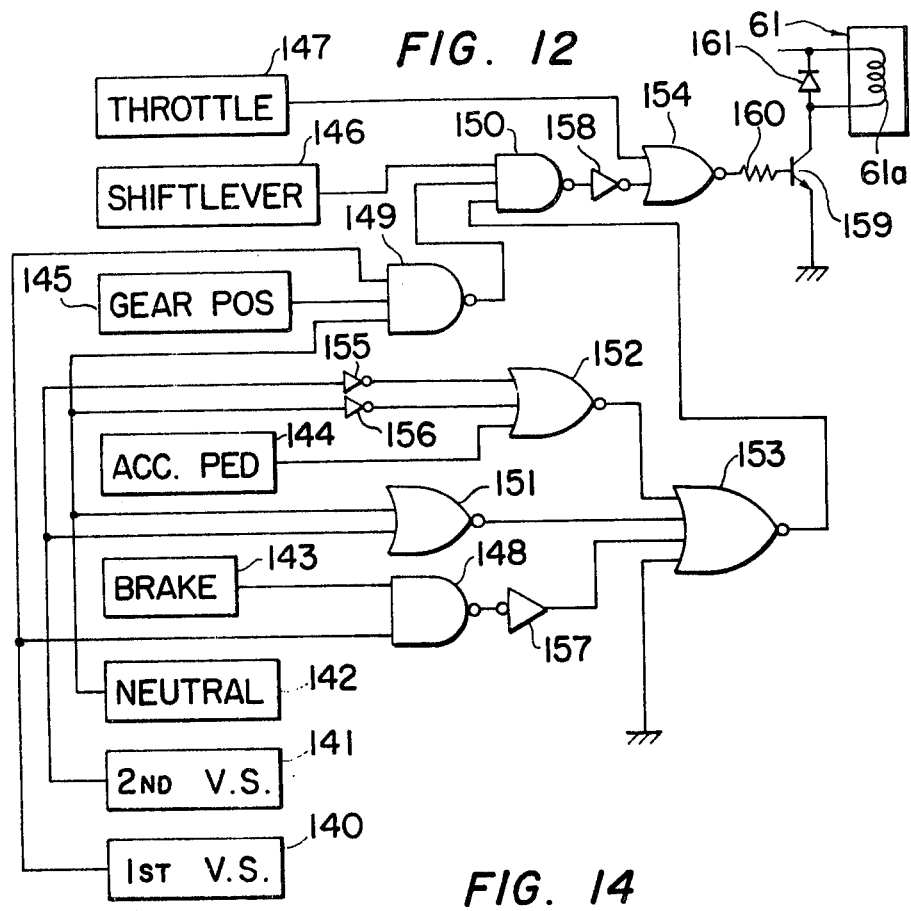
FIG. 12 is a diagram which shows a preferred form of logic control circuit incorporated into still another preferred embodiment of a clutch control apparatus according to the present invention.

FIG. 12 illustrates a control circuit of another preferred embodiment of the present invention. The valve arrangement and the clutch actuating mechanism for use with the control circuit shown in FIG. 12 are entirely similar to those shown in FIG. 7 and, thus, include first, second, third and fourth valve units 61, 62, 63 and 64 and the servo motor 33 which is void of the movable contact elements 55 of the embodiment shown in FIG. 1.

The control circuit illustrated in FIG. 12 operates on the basis of logic signals delivered from sensors 140 to 147 responsive to various operational conditions of the vehicle. The sensors 140 and 141 are first and second vehicle speed sensors, respectively. The first vehicle speed sensor 140 is operative to produce a logic "1" output signal in response to a vehicle speed lower than a predetermined first level which is herein assumed to be approximately 18 killometers per hour and a logic "0" output signal in response to a vehicle speed higher than the particular level. The second vehicle speed sensor 141 is operative to produce a logic "1" output signal in response to a vehicle speed lower than a predetermined second level lower than the above mentioned first level and a logic "0" output signal in response to a vehicle speed higher than the second level. The second level of the vehicle speed is herein assumed to be approximately 7 killometers per hour. The sensor 142 is a neutral position sensor which is adapted to produce a logic "1" output signal in response to an off-neutral gear position selected in the power transmission system and a logic "0" output signal in response to the neutral position selected in the power transmission system. The sensor 143 is a brake sensor which is operative to produce a logic "1" output signal when brakes are being applied and a logic "0" output signal when the brakes are released. The sensor 144 is an accelerator position sensor which is adapted to produce a logic "0" output signal when the accelerator pedal is kept released and a logic "1" output signal when the accelerator pedal is in a depressed condition. The sensor 145 is a gear position sensor for producing a logic "0" output signal in response to the first or second forward-drive gear position or reverse-drive gear position selected in the power transmission system and a logic "1" output signal in response to the third or fourth forward-drive gear position selected in the power transmission system. The sensor 146 is a shift-lever sensor which is operative to produce a logic "1" output signal in response to a manipulative effort applied to the transmission gear shift lever (not shown) and a logic "0" output signal when the transmission gear shift lever is kept untouched. The sensor 147 is a throttle-valve position sensor which is arranged to produce a logic "1" output signal in response to a throttle valve opening degree greater than one eighth of the fully opening degree and a logic "0" output signal when the carburetor throttle valve is open to a lesser degree.

The control circuit now comprises first, second and third logic "NAND" gate circuits 148, 149 and 150 and first, second, third and fourth logic "NOR" gate circuits 151, 152, 153 and 154. The first "NAND" gate circuit 148 has a first input terminal connected to the output terminal of the first vehicle sensor 140 and a second input terminal connected to the output terminal of the brake sensor 143. The first "NAND" gate circuit 148 is thus operative to produce a logic "1" output signal except when the vehicle is being driven at a speed lower than 18 killometers per hour without the brakes applied. The second "NAND" gate circuit 149 has a first input terminal connected to the output terminal of the first vehicle speed sensor 140, a second input terminal connected to the output terminal of the neutral position sensor 142 and a third input terminal connected to the output terminal of the gear position sensor 145. The second "NAND" gate circuit 149 is thus operative to produce a logic "1" output signal except when the vehicle is running at a speed lower than 18 killometers per hour with the third or fourth forward-drive gear position selected in the power transmission system. On the other hand, the first "NOR" gate circit 151 has a first input terminal connected to the output terminal of the second vehicle speed sensor 141 and a second input terminal connected to the output terminal of the neutral position sensor 142. The first "NOR" gate circuit 151 is thus operative to produce a logic "0" output signal except when the vehicle speed is higher than 7 killometers per hour with the transmission system held in the neutral condition. The second "NOR" gate circuit 152 has a first input terminal connected through a logic "NOT" gate circuit 155 to the output terminal of the second vehicle speed sensor 141, a second input terminal connected through a logic "NOT" gate circuit 156 to the output terminal of the neutral position sensor 142 and a third input terminal connected to the output terminal of the accelerator-pedal position sensor 144. The second "NOR" gate circuit 152 is thus operative to produce a logic "0" output signal except when the vehicle speed is lower than 7 killometers per hour with the transmission system in an off-neutral condition and with the accelerator pedal held released. The third "NOR" gate circuit 153 has a first input terminal connected through a logic "NOT" gate circuit 157 to the output terminal of the first "NAND" gate circuit 148, a second input terminal connected to the output terminal of the first "NOR" gate circuit 151 and a third input terminal connected to the output terminal of the second "NOR" gate circuit 152. The third "NOR" gate circuit 153 is thus operative to produce a logic "0" output signal except when the first "NAND" gate circuit 148 is producing a logic "1" output signal and at the same time both of the first and second "NOR" gate circuits 151 and 152 are producing logic "0" output signals. The third "NAND" gate circuit 150 has a first input terminal connected to the output terminal of the above described third "NOR" gate circuit 153, a second input terminal connected to the output terminal of the second "NAND" gate circuit 149 and a third input terminal connected to the output terminal of the previously mentioned shift-lever sensor 146. The third "NAND" gate circuit 150 is thus operative to produce a logic "0" output signal except when both of the second "NOR" gate circuit 153 and the second "NAND" gate circuit 149 are producing logic "1" output signals during a condition in which the transmission gear shift lever is being manipulated to make shift between gear positions. The fourth "NOR" gate circuit 154 has a first input terminal connected through a logic "NOT" gate circuit 158 to the output terminal of the above described "NAND" gate circuit 150 and a second input terminal connected to the output terminal of the throttle-valve position sensor 147. The fourth "NOR" gate circuit 154 is thus operative to produce a logic "0" output signal except when the third "NAND" gate circuit 150 is producing a logic "1" output signal during a condition in which the accelerator pedal is depressed into a position providing a throttle valve opening degree larger than one sighth of the fully opening degree. The fourth "NOR" gate 154 has an output terminal connected to the exciting coil 61i of the first valve unit 61 through a transistor amplifier which consists of a transistor 159 having a base connected through a resistor 160 to the output terminal of the "NOR" gate circuit 154 and a collector connected across the exciting coil 61i. The emitter electrode of the transistor 159 is grounded.

Figure 13A:
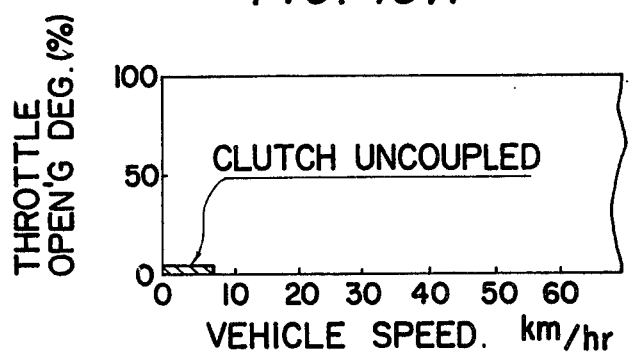
FIGS. 13A, 13B and 13C are graphs illustrating examples of the mode of operation of the clutch control apparatus incorporating the control circuit of FIG. 12.
Figure 13B:
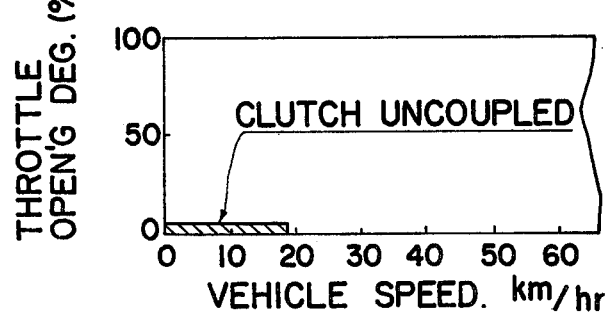
Figure 13C:
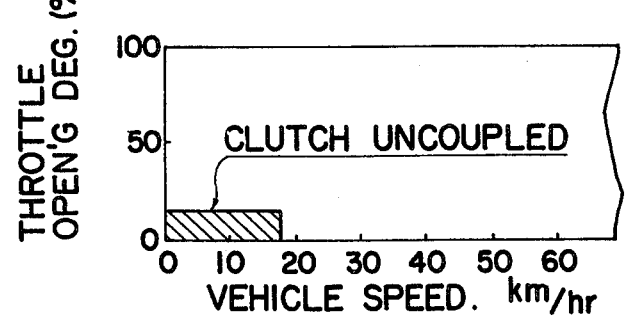

The operation of the embodiment incorporating the control circuit of FIG. 12 will now be described with reference to FIG. 7 (in connection with the valve arrangement and the clutch actuating mechanism alone) and FIG. 12 and further to FIGS. 13A, 13B and 13C in each of which a hatched area indicates, in terms of vehicle speed and carburetor throttle valve opening degree, a condition in which the clutch assembly 20 (FIG. 7) is uncoupled.

Assume, now, the vehicle is running at a speed lower than 7 killometers with the engine operating in an idling condition amd with the transmission system in the first or second forward-drive gear position or reverse-drive gear position. Under these conditions, the first and second vehicle speed sensors 140 and 141 and the neutral position sensor 142 are all held in conditions producing their respective logic "1" output signals while the accelerator-pedal position sensor 144, the gear position sensor 145 and the throttle-valve opening sensor 147 are held in conditions producing their respective logic "0" output signals. The logic "1" output signals delivered from the second vehicle speed sensor 141 and the neutral position sensor 142 are inverted into logic "0" signals by the "NOT" gate circuits 155 and 156, respectively so that the second "NOR" gate circuit 152 is supplied with logic "0" signals at all of its first, second and third input terminals and delivers a logic "1" output signal to the third "NOR" gate circuit 153. The third "NOR" gate circuit 153 is thus caused to produce a logic "0" output signal irrespective of the signals appearing at the respective output terminals of the first "NAND" gate circuit 148 and the first "NOR" gate circuit 151 and delivers a logic "0" output signal to the first input terminal of the subsequent third "NAND" gate circuit 150. The third "NAND" gate circuit 150 is therefore caused to produce a logic "1" output signal irrespective of the signals appearing at its second and third input terminals. The logic "1" output signal of the "NAND" gate circuit 150 is inverted by the "NOT" circuit 158 and is applied as a logic "0" signal to the first input terminal of the fourth "NOR" gate circuit 160. The throttle-valve position sensor 147 being in a condition producing a logic "0" signal in response to the idling condition of the engine, the fourth "NOR" gate circuit 154 produces a logic "1" output signal in the presence of the logic "0" signals at both of its first and second input terminals. The logic "1" signal from the fourth "NOR" gate circuit 154 is fed through the transistor 159 to the exciting coil 61i of the first valve unit 61. The exciting coil 61i being thus energized, the first valve unit 61 is actuated into the condition providing communication between the first and second ports 61c and 61d so that a vacuum is developed in the control chamber 42 of the servo motor 33, causing the clutch assembly 20 to be uncoupled. The uncoupled condition thus established by the clutch assembly 20 is represented by the hatched area in the graph of FIG. 13A. The clutch assembly 20 is thus held uncoupled when the engine is idling and the vehicle is running at a speed lower than the predetermined second level of 7 killometers per hour with the first or second forward-drive gear position or reverse-drive gear position established in the power transmission system.

When the vehicle speed is increased beyond the above mentioned level but still remains below the predetermined first level of 18 killometers per hour and if the brakes are applied under such a condition, the first vehicle speed sensor 140 and the brake sensor 143 are producing logic "1" signals thereof so that the first "NAND" gate circuit 148 is actuated to produce a logic "0" output signal. The logic "0" output signal of the "NAND" gate circuit 148 is inverted by the "NOT" gate circuit 157 into a logic "1" signal so that the subsequent third "NOR" gate circuit 153 is supplied with the logic "1" signal at its first input terminal. The "NOR" gate circuit 153 is therefore caused to produce a logic "0" output signal irrespective of the signals appearing at the second and third input terminals thereof. The third "NAND" gate circuit 150 is accordingly held in the previously described condition producing the logic "1" output signal irrespective of the signals supplied thereto through the second and third input terminals. The exciting coil 61i of the first valve unit 61 is thus energized with the result that the clutch assembly 20 is caused to be uncoupled. The uncoupled condition established in this fashion by the clutch assembly 20 is represented by the hatched area in the graph of FIG. 13B. When the vehicle is braked upon while running at a relatively high speed, the clutch assembly 20 is uncoupled immediately when brakes are applied.

If, furthermore, the vehicle is running at a speed lower than the above mentioned first level of 18 killometers per hour with the third or fourth forward-drive gear position selected in the transmission system and with the accelerator pedal held in a position providing a throttle valve opening degree less than one eighth of the fully opening degree, the first vehicle speed sensor 140, the neutral position sensor 142 and the gear position sensor 145 are all in the conditions producing logic "1" output signals. Under these conditions, the second "NAND" gate circuit 149 is delivering a logic "0" output signal to the second input terminal of the third "NAND" gate circuit 150. The "NAND" gate circuit 150 is therefore actuated to produce a logic "1" output signal irrespective of the signals appearing at its first and third input terminals so that the fourth "NOR" gate circuit 154 is supplied with a logic "0" signal at its first input terminal. Since, in this instance, the throttle valve opening degree is assumed to be smaller than one eighth of the fully opening degree, the fourth "NOR" gate circuit 160 is supplied with a logic "0" signal also at its second input terminal and produces a logic "1" output signal, thereby energizing the exciting coil 61i of the first valve unit 61. The clutch assembly 20 is therefore driven into the uncoupled condition as indicated by the hatched area in the graph of FIG. 13C.

If desired, the first and second vehicle speed sensors 140 and 141 may be designed so that the output signals thereof are changed from the logic "1" signals into the logic "0" signals in response to vehicle speeds increased beyond the above mentioned predetermined first and second levels of 18 and 7 killometers per hour, respectively, during acceleration of the vehicle but are changed from the logic "0" signals into the logic "1" signals when the vehicle speed is reduced below predetermined lower levels of, for example, 15 and 5 killimeters per hour, respectively, during deceleration of the vehicle. This will be conducive to preventing the first valve unit 61 from hunting when the vehicle speed fluctuated across the predetermined levels of 18 and 7 killometers per hour.

Figure 14:
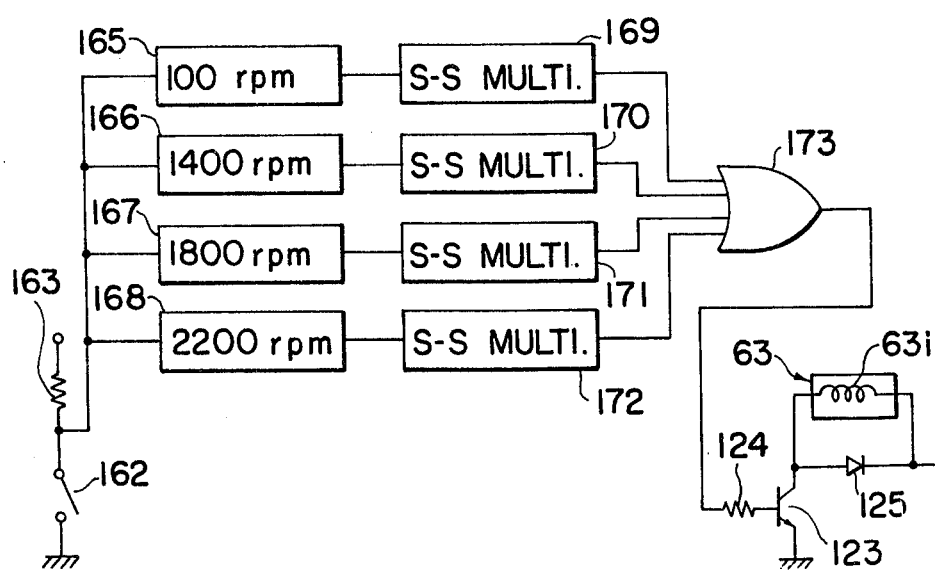
FIG. 14 is a block diagram showing a preferred form of circuit arrangement incorporated into still another preferred embodiment of a clutch control apparatus according to the present invention.

FIG. 14 illustrates a modification of the control circuit of the embodiment described with reference to FIG. 7. As in the case of the control circuit hereinbefore described with reference to FIG. 12, the control circuit illustrated in FIG. 14 is combined with a solenoid operated valve arrangement and a fluid operated clutch actuating mechanism similar to those of the embodiment of FIG. 7, though not shown.

The control circuit shown in FIG. 14 comprises first, second, third and fourth engine speed sensors 165, 166, 167 and 168 which are arranged to be responsive to the output speed of the engine and produce logic "0" output signals in response to engine speeds of different levels which are herein assumed, by way of example, to be 1000 rpm, 1400 rpm, 1800 rpm and 2200 rpm, respectively. The output speed of the engine may be detected from the opening and closing motions of a breaker point 162 or a magnetic pick-up (not shown) of the distributor of the ignition system of the engine. Designated by reference numeral 163 is a resistor through which the breaker point 162 is connected to the ignition coil. The output terminals of the engine speed sensors 165, 166, 167 and 168 thus arranged are connected to first, second, third and fourth single-shot multivibrators 169, 170, 171 and 172 each having a single output terminal. If the multivibrators 169 to 172 are constructed by bridge networks incorporating transistors, the output terminal of each multivibrator may be constituted by the collector electrode of a transistor of such a network. The single-shot multivibrators 169, 170, 171 and 172 are adapted to produce pulses $S_1$, $S_2$, $S_3$ and $S_4$, respectively, each having a positive polarity and a predetermined pulsewidth in response to the logic "0" signals appearing at the respective input terminals thereof. The output terminal of the single-shot multivibrators 169 to 172 are connected to a four-input logic "OR" gate circuit 173. The output terminal of the "OR" gate circuit 173 is connected to the exciting coil 63i of the third valve unit 63 through the previously described transistor amplifier consisting of the transistor 123, resistor 124 and diode 125 as shown.

The operation of the embodiment including the control circuit thus arranged will be hereinafter described with concurrent reference to FIG. 7 (only in connection with the valve arrangement and the clutch actuating mechanism therein shown) and FIG. 14 and further to FIG. 15 which illustrates the motions of the switch actuating plunger 46 of the servo motor 33 (FIG. 7) by plot I in relation to the variation in the engine output speed indicated by plot II and the variation in the output torque of the engine indicated by plot III.

Figure 15:
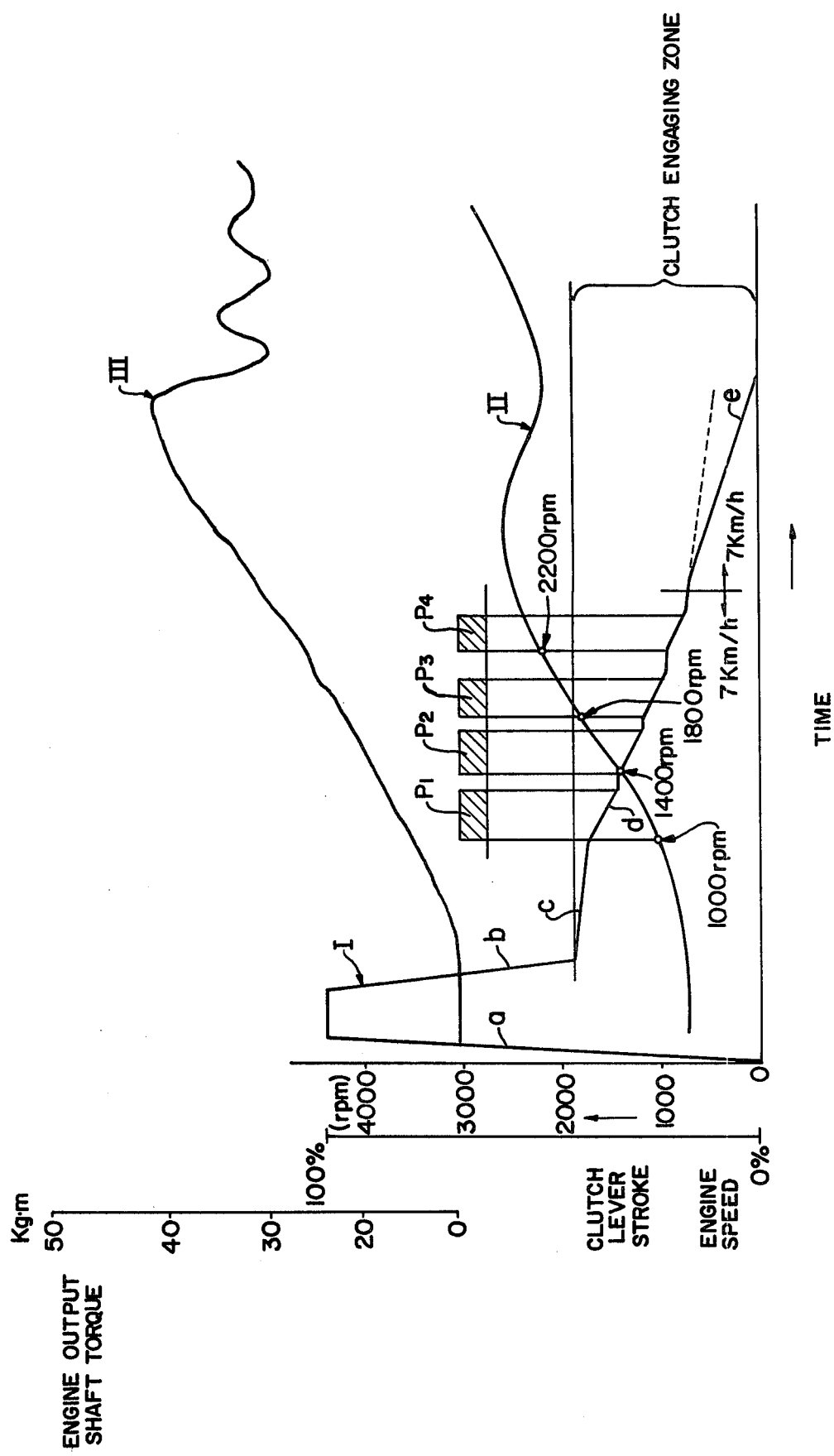
FIG. 15 is a graph which shows the performance characteristics achievable in the embodiment using the circuit arrangement of FIG. 14 in dependence upon variation in the engine output speed.

In the plot I of FIG. 15, point $a_1$ represents the position of the switch actuating plunger 46 at the previously mentioned full disengagement point FDP holding the clutch assembly 20 in the fully coupled condition. Line $a_1$-$a_2$ is thus representative of the condition in which the switch actuating plunger 46 is being moved through the allowance disengagement range, viz., from the full disengagement point FDP toward the initial engagement point IEP. When the plunger 36 is being moved through the allowance disengagement range, the first valve unit 61 remains in the condition providing communication between the first and third ports 61c and 61e thereof with the exciting coil 61i kept de-energized and the second valve unit 62 is maintained in the condition providing communication between the first and second ports 62c and 62d thereof with the exciting coil 62i energized. At point $a_2$, the switch actuating plunger 46 reaches the initial engagement point IEP so that the clutch assembly 20 is initiated into motion for the coupled condition and at the same time the second valve unit 62 is shifted into the condition providing communication between the first and third ports 62c and 62e thereof.

If, under these conditions, the output speed of the engine is lower than the first predetermined level of 1000 rpm, all of the first to fourth engine speed sensors 165 to 168 are are maintained in the conditions producing logic "1" output signals and as a consequence the first to fourth single-shot multivibrators 169 to 172 remain inoperative. The "OR" gate circuit 173 is therefore held in the condition producing a logic "0" output signal in the presence of the logic "0" signals at all of its input terminals. The exciting coil 63i of the third valve unit 63 is thus kept de-energized and maintains the valve unit 63 in the condition providing communication between the first and third ports 63c and 64d thereof. If, in this instance, the vehicle speed is lower than a certain level such as 7 killometers per hour as in the circuit arrangement of FIG. 10, the exciting coil 64i of the fourth valve unit 64 is energized and maintains the valve unit 64 in the condition providing communication between the first and second ports 64c and 64d thereof. The switch actuating plunger 46 of the servo motor 33 is accordingly driven in the partial torque transmission range at a velocity dictated by the flow rate $f_4$ of the second port 64d of the fourth valve unit 64, as indicated by line $a_2$-$a_3$ of the plot I in FIG. 15. As the engine output speed is increased as indicated by the plot II in FIG. 15 and reaches the predetermined first level of 100 rpm, the first engine speed sensor 165 delivers a logic "0" output signal to the first single-shot multivibrator 169, which is therefore trriggered to produce a pulse $S_1$ having a positive polarity and a predetermined pulsewidth. The pulse $S_1$ is passed through the "OR" gate circuit 173 to the transistor 123, which is therefore made conductive and energizes the exciting coil 63i of the third valve unit 63 for a period of time corresponding to the duration of the pulse $S_1$. The third valve unit 63 is now actuated into the condition providing communication between the first and second ports 63c and 63d thereof so that the switch actuating plunger 46 of the servo motor 33 is driven to move in the partial torque transmission range at a velocity dictated by the flow rate $f_3$ of air through the port 63d, as indicated by line $a_3$-$a_4$ of the plot I of FIG. 15, viz., at a higher velocity than under the condition indicated by the line $a_2$-$a_3$. Upon lapse of the pulse $S_1$ from the first single-shot multivibrator 169, the third valve unit 63 is rendered into the condition providing the communication between the first and third ports 63c and 63e thereof so that the switch actuating plunger 46 of the servo motor 33 is drivem to move at a velocity equal to that achieved under the condition indicated by the line $a_2$-$a_3$, provided the vehicle speed still remains at a level lower than 7 killometers per hour.

As the engine output speed is further increased and successively reaches the predetermined second, third and fourth levels of 1400 rpm, 1800 rpm and 2200 rpm, the second, third and fourth single-shot multivibrators 170, 171 and 172 are successively actuated to produce pulses $S_2$, $S_3$ and $S_4$ each having a positive polarity and a predetermined duration so that the switch actuating plunger 46 of the servo motor 33 is driven at the higher velocity during the periods of time corresponding to the durations of the pulse $S_2$, $S_3$ and $S_4$ as indicated by lines $a_5$-$a_6$, $a_7$-$a_8$, and $a_9$-$a_{10}$ at intervals indicated by lines $a_4$-$a_5$, $a_6$-$a_7$, and $a_8$-$a_9$ when the plunger is driven at the lower velocity, as indicated by the plot I of FIG. 15. Upon the termination of the fourth pulse $S_4$, the third valve unit 63 is brought into the condition closing the second port 63d and providing communication between the first and third ports 63c and 63e thereof so that the switch actuating plunger 46 of the servo motor 33 is driven toward the full engagement point FEP at the lower velocity dictated by the flow rate $f_4$ of air through the second port 64d of the fourth valve unit 64 provided the vehicle speed is still lower than 7 killometers per hour.

When the vehicle speed then exceeds the predetermined level of 7 killometers per hour as at $a_{11}$ of the plot I shown in FIG. 15, the exciting coil 64i of the fourth valve 64 is de-energized and maintains the valve unit 64 in the condition closing the second port 64d and establishing communication between the first and third ports 64c and 64e thereof. The switch actuating plunger 46 of the servo motor 33 is now driven to move at a velocity dictated by the flow rate $f_5$ of air through the third port 64e of the fourth valve unit 64 as indicated by line $a_{11}$-$a_{12}$ of the plot I shown in FIG. 15 until the plunger 46 reaches the full engagement point FEP at point $a_{12}$.

The control circuit shown in FIG. 14 has been assumed to be responsive to four different output speeds of the engine but, if desired, the clutch assembly may be controlled in the partial torque transmission range more minutely in response to five or more predetermined engine output speeds or, as an alternative, more roughly in response to less than four predetermined engine output speeds.

What is claimed is:

1. An apparatus for controlling a clutch assembly of a driveline of an automotive vehicle having a manually operated power transmission system, said clutch assembly being operative between a fully coupled condition and a fully uncoupled condition through an allowance disengagement range in which the clutch assembly is initiated into motion to couple but stays uncoupled and a partial torque transmission range in which the clutch is partially coupled, comprising a clutch actuating mechanism including a control chamber contractable and expansible between a maximum-volume condition producing said fully coupled condition in the clutch assembly and a minimum-volume condition producing said fully uncoupled condition in the clutch assembly, an electrically operated valve arrangement including a vacuum port for providing communication between said control chamber and a source of vacuum and a plurality of air ports each for providing communication between said control chamber and the open air, said vacuum port being open to develop vacuum in the control chamber for causing the control chamber to contract toward said minimum-volume condition, said air ports having different cross sectional areas and being selectively opened to admit atmospheric air into said control chamber at different rates for causing the control chamber to expand at different rates and accordingly driving the clutch assembly at different velocities toward said fully coupled condition, and an electric control circuit including stationary switch means responsive to transition of the clutch assembly between said allowance disengagement range and said partial torque transmission range and throttle-valve position responsive means responsive to variation in the opening degree of the throttle valve of the mixture supply system of the vehicle engine, said control circuit being operative to cause said valve arrangement to close said vacuum port in response to predetermined conditions in which the clutch assembly is to be coupled, said control circuit being further operative to cause the air port with the largest sectional area to open and communicate with said control chamber when the clutch assembly is operating in said allowance disengagement range and to close in response to the transition of the clutch assembly from the allowance disengagement range to the partial torque transmission range and causing the remaining air ports to selectively open and communicate with said control chamber in response to variation in the throttle opening degree detected by said throttle responsive means when the clutch assembly is engaging.

2. An apparatus as set forth in claim 1, in which said valve arrangement comprises first, second, third and fourth valve units each having first, second and third ports and a first condition providing communication between the first and third ports thereof and a second condition providing communication between the first and second ports thereof, the first port of said first valve unit being in constant communication with said control chamber, the second port of said first valve unit constituting said vacuum port, the respective first ports of said second, third and fourth valve unit being in constant communication with the respective third ports of said first, second and third valve units, respectively, the respective second ports of said second, third and fourth valve units and the third port of the fourth valve unit constituting said air ports, the second port of said second valve unit constituting said air port with the largest sectional area, the third port of said fourth valve unit being smaller in cross sectional area than the second port of said third valve unit and larger in cross sectional area than the second port of the fourth valve unit, said control circuit being operative to control said valve arrangement so as to operate said first valve unit into the first condition thereof in response to predetermined conditions for actuating the clutch assembly toward the fully coupled condition, to hold the first valve unit in the first condition thereof and the second valve unit in the second condition thereof when the clutch assembly is operating in said allowance disengagement range, to hold both of the first and second valve units in the respective second conditions thereof and the third valve unit in the first condition thereof for a period of time variable with the throttle valve opening degree after the clutch assembly has been put into operation in said partial torque transmission range, and to hold all the first, second and third valve units in the respective first conditions thereof and the fourth valve unit in the first or second condition thereof upon lapse of said period of time.

3. An apparatus as set forth in claim 2, in which said throttle-valve position responsive means comprises movable switch means movable with said throttle valve and responsive to the control chamber being expanded toward said maximum-volume condition, said stationary switch means being electrically connected to said second valve unit for actuating the second valve unit into the second condition thereof in response to the transition of the clutch assembly from the allowance disengagement condition into the partial torque transmission condition, said movable switch means being electrically connected to said third valve unit for actuating the third valve unit into the second condition thereof upon lapse of said period of time.

4. An apparatus as set forth in claim 3, in which said control circuit further comprise throttle responsive switch means responsive to a throttle opening degree of a predetermined value and electrically connected to said fourth valve unit for actuating the fourth valve unit into the second condition thereof in response to a throttle valve opening degree smaller than said predetermined value and holding the fourth valve unit in the first condition thereof in response to a throttle valve opening degree larger than said predetermined value.

5. An apparatus as set forth in claim 4, in which said control circuit further comprises first switch means responsive to an idling condition of the engine and electrically connected to said first valve unit and, in parallel with said movable switch means, to said third valve unit, second switch means responsive to a vehicle speed of a predetermined level and electrically connected across said first switch means to said first valve unit and to said third valve unit and across said throttle responsive switch means to said fourth valve unit, and third switch means responsive to predetermined gear positions shiftable in the power transmission system and electrically connected in parallel with said first switch means to said first valve unit and to said third valve unit across said second switch means, said first and second switch means being operative to actuate said first valve unit into the second condition thereof in response to a vehicle speed lower than said predetermined level, said second and third switch means being operative to actuate the first valve unit into the second condition in response to a vehicle speed lower than said predetermined limit and to a higher gear position selected in the transmission system, said second and movable switch means being operative to actuate the third valve unit into the second condition thereof in response to a vehicle speed lower than said predetermined level upon lapse of said period of time, said first and second switch means being further operative to actuate the third valve unit into the second condition thereof in response to a vehicle speed higher than said level with the engine operating in a part or full throttle condition, said second and third switch means being further operative to actuate the third valve unit into the second condition thereof in response to a vehicle speed higher than said predetermined level with a higher gear position selected in the power transmission system, and said second switch means and said throttle responsive switch means being operative to actuate the fourth valve unit into the second condition thereof in response to a vehicle speed lower than said predetermined level and to a throttle opening degree smaller than said value.

6. An apparatus as set forth in claim 5, in which said control circuit further comprises fourth switch means responsive to a neutral position selected in the power transmission system and electrically connected to said first valve unit across said second switch means and the parallel combination of said first and third switch means, said first, second and fourth switch means being operative to hold the first valve unit in the first condition thereof in response to the neutral position selected in the transmission system, to a vehicle speed lower than said predetermined level and to an idling condition of the engine.

7. An apparatus as set forth in claim 2, in which said throttle-valve position responsive means comprises a plurality of throttle-valve position sensors responsive to throttle valve opening degrees of different values and in which said control circuit further comprises a first vehicle speed sensor responsive to a vehicle speed of a predetermined first level, a second vehicle speed sensor responsive to a vehicle speed of a predetermined second level lower than said first level, a first engine speed sensor responsive to an engine output speed of a predetermined first level and a second engine speed sensor responsive to a predetermined second level lower than said first level of the engine output speed, said throttle-valve position sensors and said first vehicle speed and engine speed sensors being electrically connected to said third valve unit and operative to actuate the third valve unit into said second condition thereof for a predetermined period of time each time the throttle valve opening degree exceeds the particular value predetermined for each of the throttle-valve position sensors provided the vehicle speed detected by said first vehicle speed sensor is lower than said first level or for a predetermined period of time in response to an engine speed higher than said first level provided the vehicle speed detected by said first vehicle speed sensor is lower than said first level and the throttle valve opening degree detected by said throttle-valve position sensors is larger than predetermined one of said values, one of said throttle-valve position sensors and said second vehicle speed and engine speed sensors being electrically connected to said fourth valve unit and operative to actuate the fourth valve unit into the second condition thereof in response to an engine output speed lower than said second level provided the vehicle speed detected by said second vehicle speed sensor is lower than said second level and the throttle valve opening predetermined first level, a second vehicle speed sensor responsive to a predetermined second level lower than said first level, a brake sensor responsive to a condition in which brakes are being applied, an accelerator pedal sensor responsive to a released condition of the accelerator pedal, and a gear position sensor responsive to the gear positions shiftable in the power transmission system, all of said sensors being electrically connected to said first valve unit and operative to actuate the first valve unit into said second condition producing the fully uncoupled condition in the clutch assembly in response to a vehicle speed lower than said second level, to a lower foward-drive gear position or reverse-drive gear position selected in the transmission system and to the released condition of the accelerator pedal, in response to a vehicle speed lower than said first level, to a lower forward-degree detected by said one of the throttle-valve position sensors is smaller than said predetermined one of said values and to hold the fourth valve unit in said first condition thereof for a predetermined period of time in response to an engine output speed higher than said second level provided the vehicle speed detected by said second vehicle speed sensor is lower than said second level or the throttle valve opening degree detected by said one of the throttle-valve position sensors is larger than said predetermined one of said values.

8. An apparatus as set forth in claim 2, in which said throttle-valve responsive means comprises a throttle-valve position sensor responsive to a throttle valve opening degree of a predetermined value and in which said control circuit further comprises a first vehicle speed sensor responsive to a vehicle speed of a drive gear position or reverse-drive gear position and to said condition in which brakes are being applied and to the released condition of the accelerator pedal, or in response to a vehicle speed lower than said first level, to a higher forward-drive gear position selected in the transmission system, and to a throttle valve opening degree smaller than said value.

9. An apparatus as set forth in claim 2, in which said control circuit further comprises a plurality of engine speed sensors responsive to engine output speeds of different levels and electrically connected to said third valve unit, each of said engine speed sensors being operative to actuate said third valve into said second condition thereof for a predetermined period of time in response to an engine output speed exceeding the particular level predetermined for the sensor.

* * * * *